United States Patent [19]
Konopik et al.

[11] Patent Number: 4,768,149
[45] Date of Patent: Aug. 30, 1988

[54] SYSTEM FOR MANAGING A PLURALITY OF SHARED INTERRUPT HANDLERS IN A LINKED-LIST DATA STRUCTURE

[75] Inventors: Bradly J. Konopik, Gaithersburg, Md.; David J. Bradley, Boca Raton, Fla.; Martin A. Reed, Rockville; Alan R. Tannenbaum, Washington Grove, both of Md.; Michael R. Turner, Boca Raton, Fla.

[73] Assignee: International Business Machines Corporation, Armonk, N.Y.

[21] Appl. No.: 770,541

[22] Filed: Aug. 29, 1985

[51] Int. Cl.[4] .............................................. G06F 9/46
[52] U.S. Cl. .................................................... 364/200
[58] Field of Search ... 364/200 MS File, 900 MS File, 364/300

[56] References Cited
U.S. PATENT DOCUMENTS 4,378,589 3/1983 Finnegan et al. .................. 364/200

Primary Examiner—Raulfe B. Zache
Attorney, Agent, or Firm—John E. Hoel

[57] ABSTRACT

A system is disclosed for managing a plurality of interrupt handlers in a linked-list data structure, for servicing a plurality of input/output devices sharing a common interrupt line in a microcomputer. The system provides for an orderly method to link a newly loaded interrupt handler routine into a linked-list data structure consisting of previously loaded interrupt handler routines. The system further provides for an orderly method to share a common interrupt line among a plurality of input/output devices being serviced by the interrupt handlers. The system further provides for an orderly means to unlink a particular interrupt handler routine from the linked-list data structure when a corresponding input/output device is to be deactivated. The system finds special utility in a multitasking operating system environment where input/output devices can be deactivated in a different sequence from that in which they were originally activated.

14 Claims, 21 Drawing Sheets

POLLED METHOD

INTERRUPT METHOD

MICROCOMPUTER SYSTEM WITH SHARED INTERRUPT

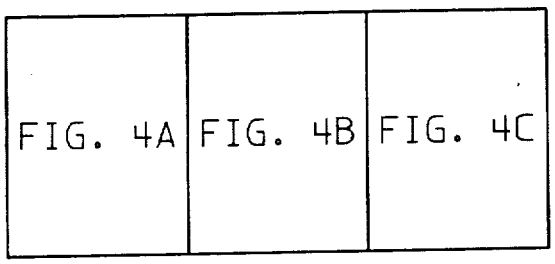
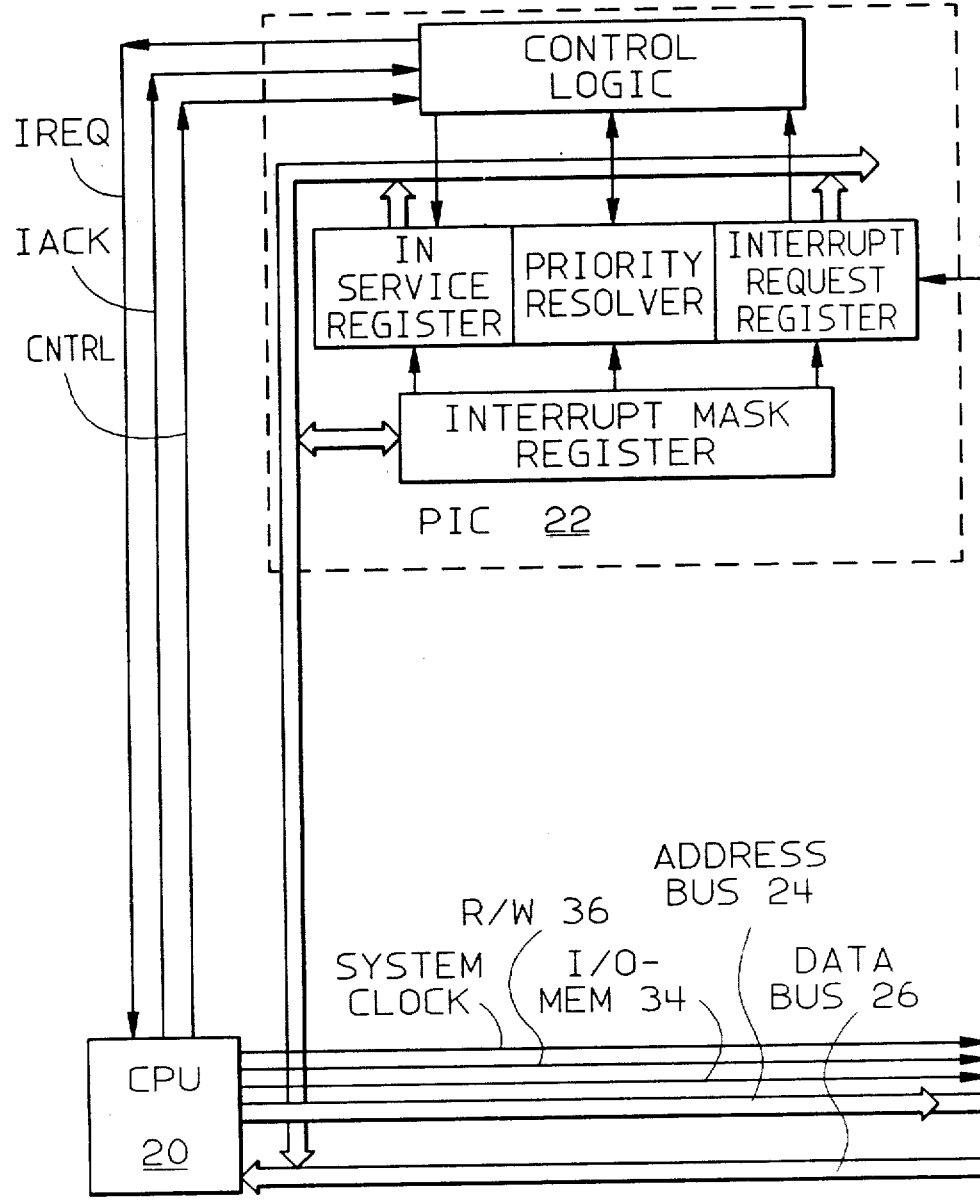
FIG. 4
DETAIL OF I/O DEVICE INTERRUPT LOGIC
FIG. 4A

RELATIONSHIP OF
I/O DEVICES
AND INTERRUPT
HANDLERS

LINKING
ROUTINE L(N)

FIG. 7
INTERRUPT HANDLER H(N)

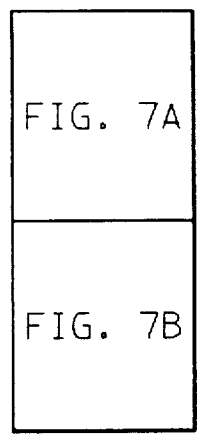

FIG. 7A

FROM INTERRUPT VECTOR
OR PRIOR INTERRUPT
HANDLER IN CHAIN ◯ 100

| 102 | ENTRY | PROC | FAR | |
|---|---|---|---|---|
| | | JMP | SHORT PAST | ; ENTRY POINT OF HANDLER |

| 104 | FPTR | DD | 0 | ; FORWARD POINTER |
|---|---|---|---|---|
| | SIGNATURE | DW | 424BH | ; USED WHEN UNLINKING TO IDENTIFY |
| | | | | ;   COMPATIBLE INT HANDLERS |
| | FLAGS | DB | 0 | ; FLAGS |

RESET INPUT ◯ 106

| 108 | FIRST | EQU | 80H | |
|---|---|---|---|---|
| | JMP | SHORT | RESET | |
| | RES_BYTES | DB | 7 DUP (0) | ; FUTURE EXPANSION |

| | PAST: | STI | | ; ACTUAL START OF HANDLER CODE |
|---|---|---|---|---|
| | | PUSH | | ; SAVE NEEDED REGISTERS |
| | | MOV | DX,YOUR_CARD | ; SELECT YOUR STATUS REGISTER |
| Y | 110 | IN | AL,DX | ; READ THE STATUS REGISTER |
| | | TEST | AL,ISB | ; YOUR CARD CAUSED THE INT? |
| | | JNZ | SERVICE | ; YES, BRANCH TO SERVICE LOGIC |
| Y | 112 | TEST | CS:FLAGS,FIRST | ; ARE WE THE FIRST ONES IN? |
| | | JNZ | EXIT | ; IF YES, BRANCH FOR EOI |
| | | | | ;   AND REARM |
| | 114 | POP | ... | ; RESTORE REGISTERS |
| | | CLI | | ; DISABLE INTERRUPTS |
| | | JMP | DWORD PTR CS:FPTR | ; PASS CONTROL TO NEXT |
| | | | | ;   GUY ON CHAIN |

TO NEXT INTERRUPT
HANDLER IN CHAIN ◯ 116

FIG. 8
UNLINKING ROUTINE U(N)

| FIG. 8A |
|---|
| FIG. 8B |

FIG. 8A

200 — FROM OPERATING SYSTEM OR APPLICATION PROGRAM AP(N)

202
```
        PUSH    DS
        PUSH    ES
        CLI                             ; DISABLE INTERRUPTS
        MOV     AX,350FH                ; DOS GET INTERRUPT VECTOR
        INT     21H                     ; ES:BX POINTS TO FIRST OF CHAIN
        MOV     CX,ES                   ; PICKUP SEGMENT PART OF INT VECTOR
```

204
```
; ARE WE THE FIRST HANDLER IN THE CHAIN?
        MOV     AX,SEG ENTRY            ; GET CODE SEG INTO COMPARABLE REG
        CMP     BX,OFFSET ENTRY         ; INT VECTOR IN LOW MEMORY
                                        ;   POINTING TO YOUR HANDLER'S
                                        ;   OFFSET?
        JNE     UNCHAIN_A               ; NO, BRANCH
        CMP     AX,CX                   ; VECTOR POINTING TO YOUR HANDLER'S
                                        ;   SEGMENT?
        JNE     UNCHAIN_A               ; NO, BRANCH
```

NO

```
; SET INTERRUPT VECTOR IN LOW MEMORY TO POINT TO THE HANDLER
; POINTED TO BY YOUR POINTER

PUSH    DS
        MOV     MOV DX,WORD PTR CS:FPTR
        MOV     MOV DS,WORD PTR CS:FPTR (2)
        MOV     AX,250FH                ; DOS SET INTERRUPT VECTOR
        INT     21H
        POP     DS
        JMP     UNCHAIN X
```
206

INITIAL DEFAULT
INTERRUPT

LINKING A FIRST NEW
INTERRUPT HANDLER H(A)

LINKING A SECOND NEW
INTERRUPT HANDLER H(B)

LINKING A THIRD NEW
INTERRUPT HANDLER H(C)

UNLINKING INTERRUPT
HANDLER H(B)

SOFTWARE MODULES
ASSOCIATED WITH
THE APPLICATION "N"

SYSTEM FOR MANAGING A PLURALITY OF SHARED INTERRUPT HANDLERS IN A LINKED-LIST DATA STRUCTURE

BACKGROUND OF THE INVENTION

1. Technical Field

The invention disclosed broadly relates to improvements in digital computer architecture and more particularly relates to an improved system and method for sharing a hardware interrupt among a plurality of input-/output devices in a microcomputer system.

2. Background Art

Modern microcomputer systems generally include a central processing unit (CPU) which is connected by means of an address bus and a data bus to a plurality of input/output (I/O) devices such as serial communications devices, local area network interfaces, parallel printers, diskette controllers, real time clocks, specialized attached processors, fixed disk controllers and the like. Generally such I/O devices operate asynchronously from the CPU and only require the attention of the CPU at randomly occurring intervals.

Two principal approaches have been employed in the prior art to coordinate the servicing of such I/O devices by a CPU, the first approach being the status polling method and the second approach being the interrupt method.

FIG. 1 illustrates a generalized microcomputer system architecture employing the status polling method for servicing a plurality of I/O devices. FIG. 1 shows the CPU 20' being connected by means of the data bus 26 to a plurality of I/O devices 23 and 25 and to the system writeable random access memory (RAM) 32 and the system read only memory (ROM) 30. A plurality of status polling lines 21 are output from the CPU 20' and respectively go to each of the I/O devices 23 and 25. A multiplexer 19 can be used to reduce the number of polling lines 21 connected to the CPU. In the status polling method, the CPU 20' must test each I/O device in sequence and determine if it needs servicing. Since the main program in the CPU 20' devotes a substantial proportion of its time to periodically polling the I/O devices 23 and 25, this method has the effect of diminishing the system throughput for the microcomputer system.

FIG. 2 shows the alternate prior art approach employing the interrupt method. In FIG. 2, the CPU 20 is connected by means of the data bus 26 to the I/O devices 27 and 29 and to the RAM 32 and the ROM 30. An additional hardware element included in the system of FIG. 2 is the programmable interrupt controller (PIC) 22 which is also connected to the data bus 26. Each of the I/O devices 27 and 29 has a separate, dedicated interrupt line 28 going to the programmable interrupt controller 22. The programmable interrupt controller 22 receives an interrupt signal (IRQ) from one of the I/O devices 27 or 29 over that one of the interrupt lines 28 dedicated to that I/O device and the PIC 22 outputs an interrupt request (IREQ) to the CPU 20. The CPU is allowed to execute its main program until it receives an interrupt request (IREQ) from the PIC 22. It then stops to service that I/O device issuing the corresponding interrupt signal (IRQ). The interrupt request (IREQ) sent by PIC 22 to the CPU 20 informs the CPU that it should complete whatever instruction that is currently being executed and then fetch a new routine, called an interrupt handler, which will service the I/O device requesting the interrupt. Once this servicing is complete, the CPU 20 will resume its main program from the point where it left off. The interrupt method of FIG. 2 significantly increases system throughput over the status polling method of FIG. 1.

Programmable interrupt controllers 22 are available in the prior art which provide overall management in an interrupt driven microcomputer system. The programmable interrupt controller functions to accept interrupt signals (IRQ) from I/O devices, determine which of the incoming IRQ signals has the highest priority, determine whether the incoming IRQ signal has a higher priority value than the level currently being serviced, and issue an interrupt request IREQ to the CPU 20 based upon this determination. One example of such a programmable interrupt controller 22 is the Intel 8259A Programmable Interrupt Controller which is described in the *iAPX 86, 88 Users Manual*, August 1981, pages B-67 through B-83, published by Intel Corporation.

An example of a microcomputer system architecture employing a programmable interrupt controller 22 in the manner illustrated in FIG. 2, is the IBM Personal Computer which is described in the *IBM Personal Computer Technical Reference Manual*, August 1981, published by International Business Machines Corporation. This publication describes a central processing unit 20, embodied as an Intel 8088 CPU, which is capable of servicing eight interrupt lines 28 by means of a programmable interrupt controller 22, embodied as an Intel 8259A.

Each I/O device in FIG. 2 generally has a dedicated program which is associated with its specific operational requirements, generally called a service routine or interrupt handler. In the IBM Personal Computer, access is gained to the interrupt handler by means of an interrupt vector. The term "interrupt vector" means a location in memory which is used to hold the address of another location where the interrupt handler program is located. Initially, when system power is turned on, one of the initialization operations is to construct a set of at least eight interrupt vectors in the low order memory locations in the RAM 32. Each interrupt vector represents the memory address for the starting point of an interrupt handler routine for handling the interrupt signal from one of the eight I/O devices requesting an interrupt on a corresponding one of the eight interrupt lines 28. In the prior art mode of operation of the IBM Personal Computer, the Intel 8259A Programmable Interrupt Controller 22 detects an interrupt signal (IRQ0 through IRQ7) when an I/O device 27 or 29 pulls the corresponding one of the interrupt lines 28 to a relatively high potential. If the PIC 22 honors the request, the IREQ output line to the Intel 8088 CPU 20, will go high, indicating to the CPU that a valid interrupt request has been made. When an interrupt request is present at the IREQ line at the CPU 20, the Intel 8088 CPU 20 enters its interrupt acknowledge machine cycle. The interrupt acknowledge machine cycle completes the processing of the current instruction and stores away current status flags, the contents of certain operating registers, and the current instruction pointer onto a last-in/first-out stack provided in the RAM 32. The Intel 8088 CPU 20 then issues the first of two interrupt acknowledge (IACK) pulses which signal the PIC 22 that the CPU 20 has honored its interrupt request. The Intel 8259A Programmable Interrupt Controller 22 is now ready to initiate the execution of the interrupt handler routine by means of one of the interrupt vectors in the RAM 32. This is done during the sequence of the two interrupt acknowledge pulses (IACK) issued by the CPU 20. The second interrupt acknowledge pulse causes the PIC 22 to place a single interrupt vector byte onto the data bus 26, which pertains to the desired interrupt vector corresponding to the interrupt handler routine. When the CPU 20 receives the interrupt vector byte from the PIC 22, it computes the actual address of the interrupt vector location in the RAM 32. The contents of the addressed interrupt vector in the RAM 32 is then accessed by the CPU 20, that contents being the address of the beginning of the interrupt handler routine which will service the interrupt of the I/O device requesting attention. Program execution of the interrupt handler routine is then carried out by the CPU 20.

An example of the prior art mode of operation to perform a request for service can be given with an asynchronous communications controller as the I/O device 27, which has just received a byte of data from a communications medium. The I/O device 27 will request service from the CPU 20 to transfer the received byte of data to an appropriate buffer previously set aside in the RAM 32. The corresponding interrupt handler routine in the RAM 32 is accessed by its corresponding interrupt vector, and provides the instruction sequence necessary to enable the CPU 20 to perform the transfer of the received byte of data from the I/O device 27 to the RAM 32.

Once the interrupt handler routine has completed execution, the main program which was previously being executed by the CPU 20, may be reentered by using an interrupt return instruction (IRET) at the end of the interrupt handler routine. The interrupt return instruction (IRET) will read back the instruction pointer, code segments, and flags from the memory stack in the RAM 32 and will place them in the appropriate locations in the CPU 20. Thus, the main program will resume in the CPU where it was interrupted, regardless of the changes which have occurred during the interrupt handler routine execution.

For convenience of description, each of the eight interrupt lines 28 will be referred to hereinafter by the name of the interrupt signal (IRQ0 through IRQ7) on the respective line. As described in the above cited *IBM Technical Reference Manual,* in the IBM Personal Computer, two of the eight interrupt lines going into the Intel 8259A Programmable Controller 22 are are dedicated to the system timer and to the keyboard. The highest priority interrupt line IRQ0 is connected to the system timer and the next highest interrupt line IRQ1 is connected to the keyboard controller. This leaves the six remaining interrupt lines IRQ2 through IRQ7 to be shared among the I/O devices. The next highest interrupt request line IRQ2 is connected to the display adapter to indicate when the vertical retrace interval occurs. The second lowest priority interrupt request line IRQ6 is connected to the diskette controller and is active when that controller has completed an operation. Thus it is seen that the availability of spare interrupt lines 28 to the programmable interrupt controller 22 will be further diminished by the addition of optional I/O devices such as serial communications adapters, parallel printer adapters, fixed disk controllers, local area network adapters, and the like.

An approach to solving the problem of a limited number of interrupt lines is provided by the logic circuit arrangement described in the copending patent application by David Bradley, entitled "Interrupt Level Sharing," U.S. patent application Ser. No. 629,868, filed July 11, 1984 now Pat. No. 4,631,670 and assigned to the International Business Machines Corporation. In the prior art, I/O devices which attach to an interrupt line, operate by holding the interrupt line (IRQ) at a low level and then drive the line high to cause an interrupt signal. In contrast, the Bradley patent application provides a shared interrupt logic unit on each of a plurality of I/O devices sharing a single interrupt line. The shared interrupt logic unit allows the shared interrupt line to float to a high potential. Each I/O device sharing the interrupt line may cause an interrupt signal by pulsing the shared interrupt line to a low potential level, using its respective shared interrupt logic unit. The leading edge of the pulse arms the programmable interrupt controller and the trailing edge of the pulse signals the programmable interrupt controller to cause the interrupt request to the CPU. The shared interrupt logic unit on each I/O device must monitor the shared interrupt line for the occurrence of an interrupt signal from one of the I/O devices connected to the line. When any I/O device connected to the interrupt line drives the line to a low potential, the shared interrupt logic unit on each respective I/O device connected to the line, will prevent the issuing of any further interrupt signals until all of the shared interrupt logic units are rearmed by a global rearm signal. The shared interrupt logic unit on each respective I/O device connected to the shared interrupt line, includes an interrupt status bit and an interrupt enable bit which can be controlled and monitored by its corresponding interrupt handler routine. If the interrupt status bit for an I/O device is at a first binary state when the shared interrupt logic unit is rearmed, the shared interrupt logic unit reissues an interrupt signal. In this manner, the loss of interrupts is prevented if two I/O devices issue an interrupt signal at the same time and an interrupt handler routine issues a global rearm signal after servicing one of the I/O devices.

The problem of how to share a single interrupt line among several I/O devices serviced by several different interrupt handlers, becomes complex in multiprogramming or multitasking systems. In a multitasking system, programs can be started or terminated at any time and in any order. If a procedure were to be adopted of sequentially saving the contents of the interrupt vector for sequentially loaded interrupt handlers, such a procedure will not work in a multitasking system where any one of a sequence of programs sharing the same interrupt can be terminated in any order.

Multitasking operating systems have the ability to switch between several applications programs which are concurrently resident in the system RAM. Typically, a multitasking operating system will partition the system RAM into a plurality of protected regions, each of which will contain a separate applications program. Each partition can have its own command prompt and thus the user can switch to a background partition, start a compiler, print a listing, or start any other program requiring little keyboard interaction, and then switch back to the main (foreground) partition and continue to work while the other programs are running. For example, in the IBM Personal Computer, a multitasking operating system can work by installing itself between the DOS operating system and the applications programs. Whenever an applications program calls up DOS or the basic I/O system, the applications program must first go through the multitasking operating system. The multitasking operating system can then decide whether it's time to run one of the other concurrently active applications programs and it can give control of the system to the new applications program instead of continuing the original applications program which made the call to DOS. For those applications programs which do not make frequent calls to DOS, a time slicing technique can be employed to assure that the program in the multitasking environment will get its fair share of time at sufficiently regular intervals. In time slicing, the multitasking operating system keeps track of how long the currently running task has been executing. If a task does not make a call to DOS after a certain amount of time has elapsed, the multitasking operating system stops the currently running task and allows other applications programs to run for an equal length of time. Priority scheduling features can also be included in such multitasking operating systems to enable higher priority applications programs to obtain a greater proportion of running time.

It is in such multitasking operating systems that the problem of how to share one interrupt line among several I/O devices becomes acute. The out-of-sequence termination of the interrupt handlers for the I/O devices prevents the application of a simple concatenation procedure for the consecutive accessing of interrupt vector addresses, as a solution to the problem.

OBJECTS OF THE INVENTION

It is therefore an object of the invention to provide an improved interrupt sharing technique.

It is a further object of the invention to provide an improved technique to enable a plurality of I/O devices to share a single interrupt line.

It is still a further object of the invention to provide an improved interrupt sharing technique which allows out-of-sequence termination of interrupt handler routines in a multitasking environment.

It is yet a further object of the invention to manage a plurality of shared interrupt handlers in a linked-list data structure, in an improved manner.

SUMMARY OF THE INVENTION

These and other objects, features and advantages of the invention are accomplished by the system disclosed herein. A system is disclosed for managing a plurality of interrupt handlers in a linked-list data structure, for servicing a plurality of input/output devices sharing a common interrupt line in a microcomputer. The system provides for an orderly method to link a newly loaded interrupt handler routine into a linked-list data structure consisting of previously loaded interrupt handler routines. The system further provides for an orderly method to share a common interrupt line among a plurality of input/output devices being serviced by the interrupt handlers. The system further provides for an orderly means to unlink a particular interrupt handler routine from the linked-list data structure when a corresponding input/output device is to be deactivated. The system finds special utility in a multitasking operating system environment where input/output devices can be deactivated in a different sequence from that in which they were originally activated.

In accordance with the invention, an interrupt sharing program provides for an orderly method to link a newly loaded interrupt handler routine into a linked-list data structure or chain of previously loaded interrupt handler routines. The interrupt sharing program further provides an orderly method to share the interrupt line while a given application program is active. Still further, the interrupt sharing program provides an orderly means to unlink a particular interrupt handler routine from a chain of a plurality of interrupt handler routines, when the application program corresponding to the particular interrupt handler routine is to be deactivated in a multitasking operating system environment.

Further in accordance with the invention, in the method of linking a newly loaded interrupt handler routine into a chain of previously loaded interrupt handler routines, the newly activated application program corresponding to the newly loaded interrupt handler routine, replaces the interrupt vector in low memory with a pointer to its own newly loaded interrupt handler routine. The existing interrupt vector is used as a forward pointer address and is stored at a fixed memory offset from the newly loaded interrupt handler routine.

Still further in accordance with the invention, in the method of sharing the interrupt level during ongoing operations, when the newly loaded application program's interrupt handler routine gains control as a result of an interrupt signal on the shared interrupt line, the newly loaded interrupt handler reads the contents of the corresponding I/O device's interrupt status register to determine if the corresponding I/O device has caused the interrupt signal on the shared interrupt line. If the corresponding I/O device has caused the interrupt signal, the newly loaded interrupt handler routine services the interrupt, disables the interrupts by issuing a processor control instruction (CLI), issues a nonspecific end-of-interrupt command to the programmable interrupt controller when the interrupt handler routine has been completed, and then rearms the shared interrupt logic units on all of the I/O devices sharing the interrupt line by issuing a global rearm signal, accomplishing this by writing to a particular I/O address which is monitored by the shared interrupt logic units on all of the I/O devices sharing the interrupt line. Each I/O device decodes the address, which results in a global rearm signal being applied to each I/O device. The interrupt handler routine then issues a return from interrupt (IRET) instruction which transfers control back to the point of interruption when exiting from the interrupt handler routine. If, instead, the I/O device corresponding to the newly loaded application program did not cause the interrupt signal on the shared interrupt line, then the newly loaded interrupt handler routine passes control to the next most recently loaded interrupt handler routine in the chain of interrupt handler routines, making use of the forward pointer address which is stored at the fixed memory offset from the newly loaded interrupt handler routine.

In accordance with the invention, in the method to unlink a particular interrupt handler routine from the chain of interrupt handler routines, the interrupt sharing program must first locate the position of the interrupt handler routine within the chain. This is performed by starting at the interrupt vector in low memory and using the forward pointer for each consecutive interrupt handler routine to find the entry point for the next interrupt handler routine. As each interrupt handler routine in the chain is encountered, its identity is compared with the identity of the target interrupt handler to be deleted. When the target interrupt handler routine is encountered in the chain, it is deleted by taking the forward pointer of the previous interrupt handler routine in the chain and replacing it with the forward pointer in the target interrupt handler routine, thereby allowing the chain to skip around the deleted interrupt handler routine.

Another feature of the invention is the provision of a flag in the interrupt handler which identifies whether a particular handler is the last one in a chain. Since a global rearm signal must be issued to all I/O devices sometime during the processing of an interrupt, if none have been so issued by the time the last handler in the chain is reached, the flag setting forces the last handler to issue the global rearm signal.

Additional features of the invention include providing a characteristic signature which is stored at a fixed memory offset from each interrupt handler routine, and which is interrogated to determine if the interrupt handler chain has been corrupted. During the execution of the unlinking method, if it is discovered that the interrupt chain has been corrupted, an unlinking error recovery procedure can be invoked. An example of an error recovery procedure would be one that restores the original interrupt vector in low memory, and bypasses the corrupted portion of the interrupt handler chain.

The resulting shared interrupt apparatus and method invention provides an improved interrupt sharing technique which enables a plurality of I/O devices to share a single interrupt line and which further allows the out-of-sequence termination of interrupt handler routines in a multitasking operating system environment.

BRIEF DESCRIPTION OF THE DRAWINGS

These and other objects, features and advantages of the invention will be more fully appreciated with reference to the accompanying Figures.

FIGS. 4, 4A, 4B and 4C are more detailed diagram of the microcomputer of FIG. 3, in accordance with the invention.

FIGS. 7, 7A and 7B are a flow diagram of the interrupt handler routine H(N) in accordance with the invention, including an example of its assembly language instructions.

FIGS. 8, 8A and 8B are a flow diagram of the unlinking logic routine U(N) in accordance with the invention, including an example of its assembly language instructions.

DESCRIPTION OF THE BEST MODE FOR CARRYING OUT THE INVENTION

Figure 1:
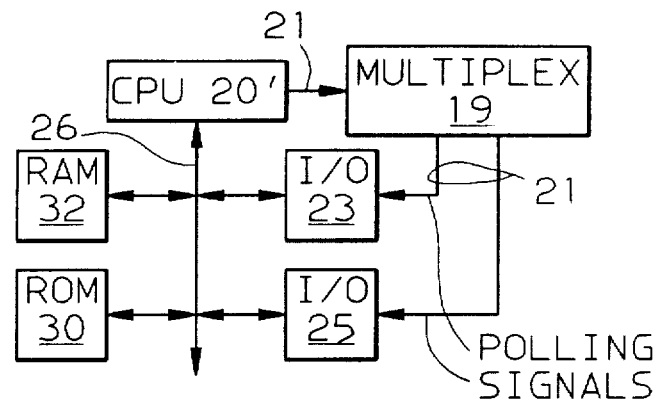
FIG. 1 is an illustration of a prior art microcomputer system employing the status polling method.
Figure 2:
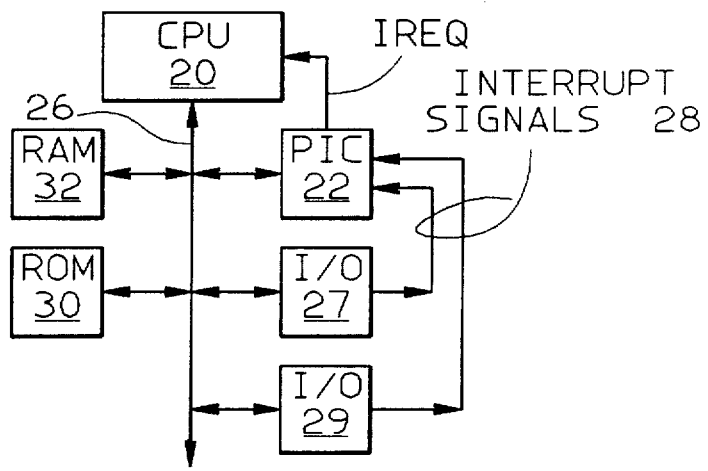
FIG. 2 is an illustration of a prior art microcomputer system employing the interrupt method.
Figure 3:
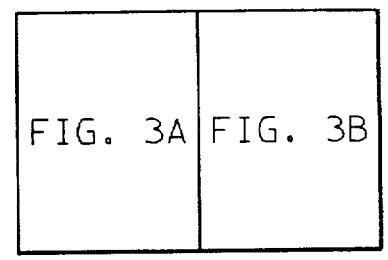
FIGS. 3, 3A and 3B are a system block diagram of a microcomputer including the system, in accordance with the invention.
Figure 3A:
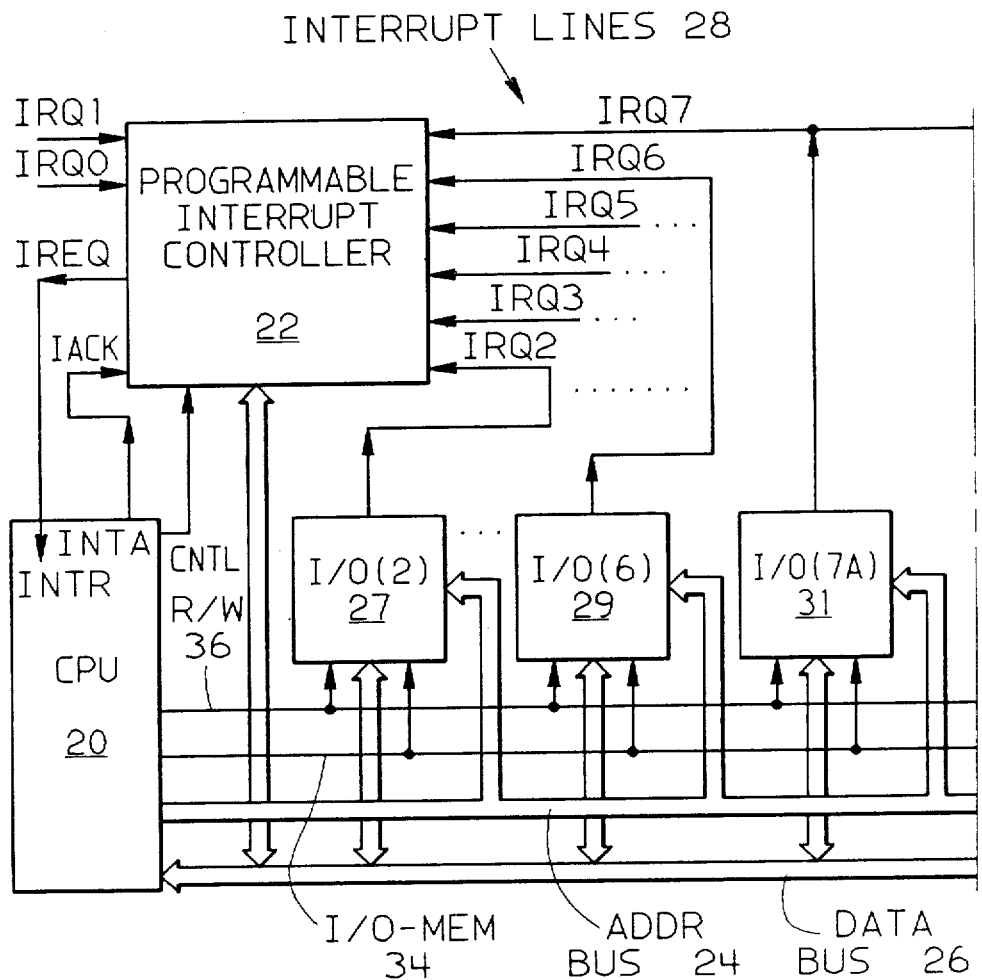
Figure 3B:
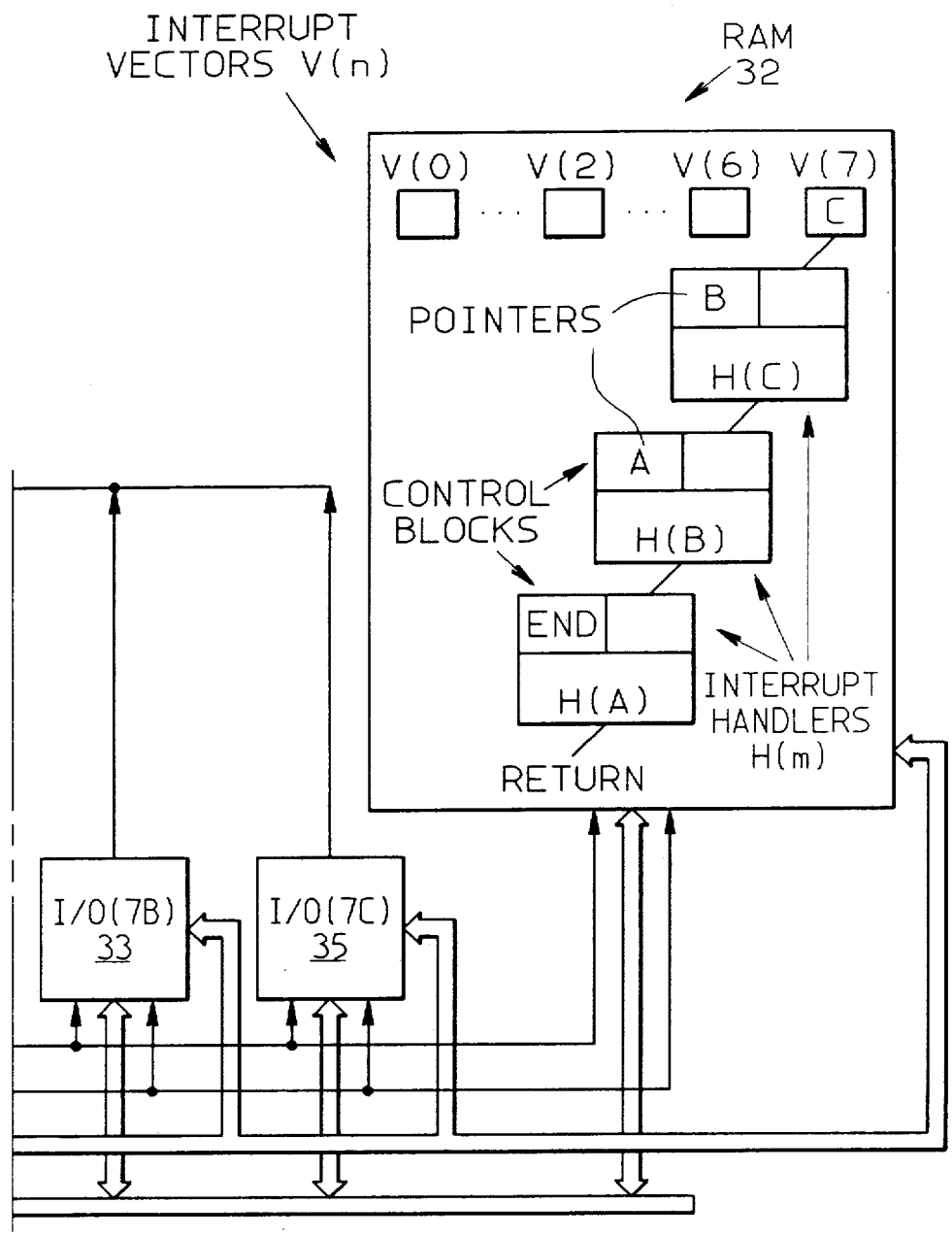
Figure 4B:
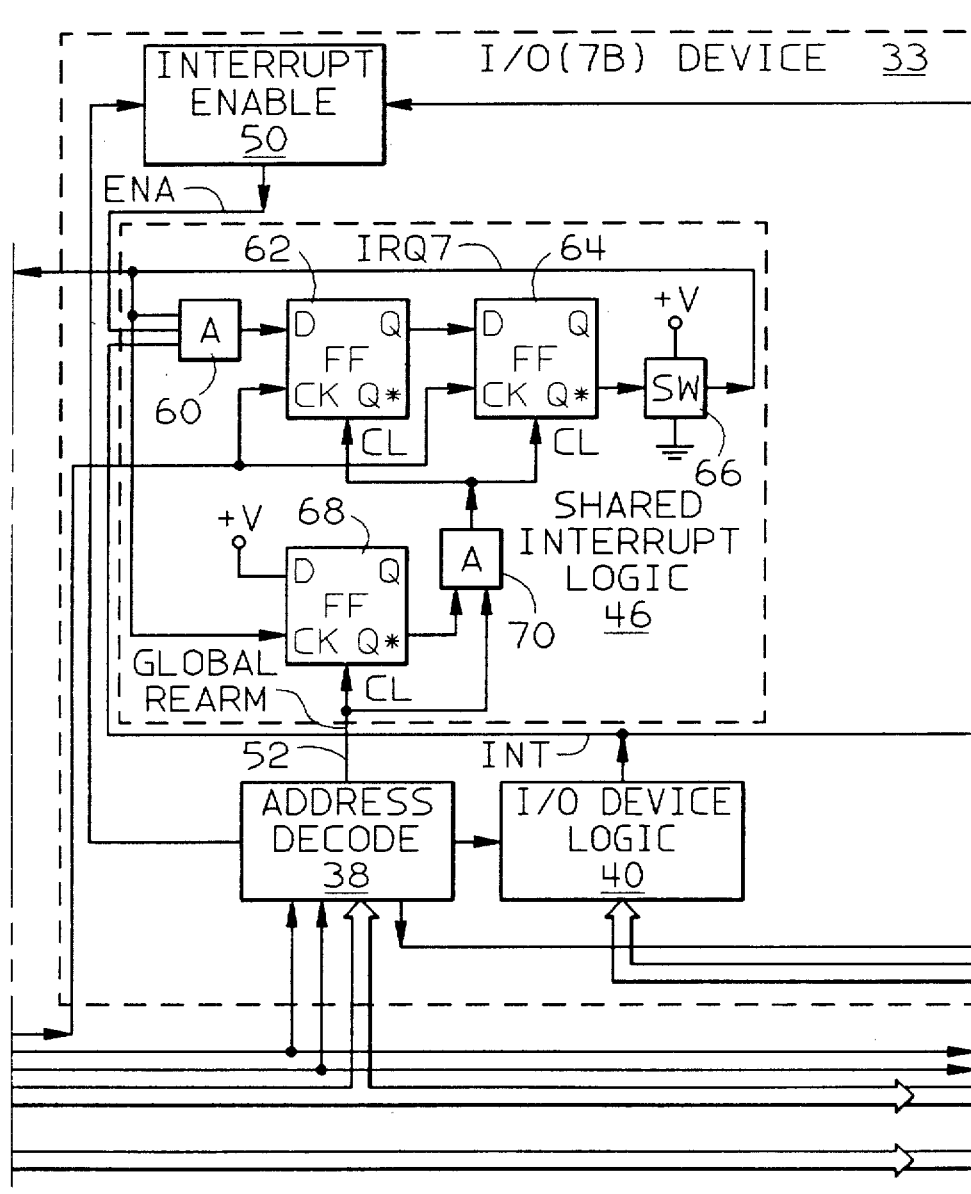
Figure 4C:
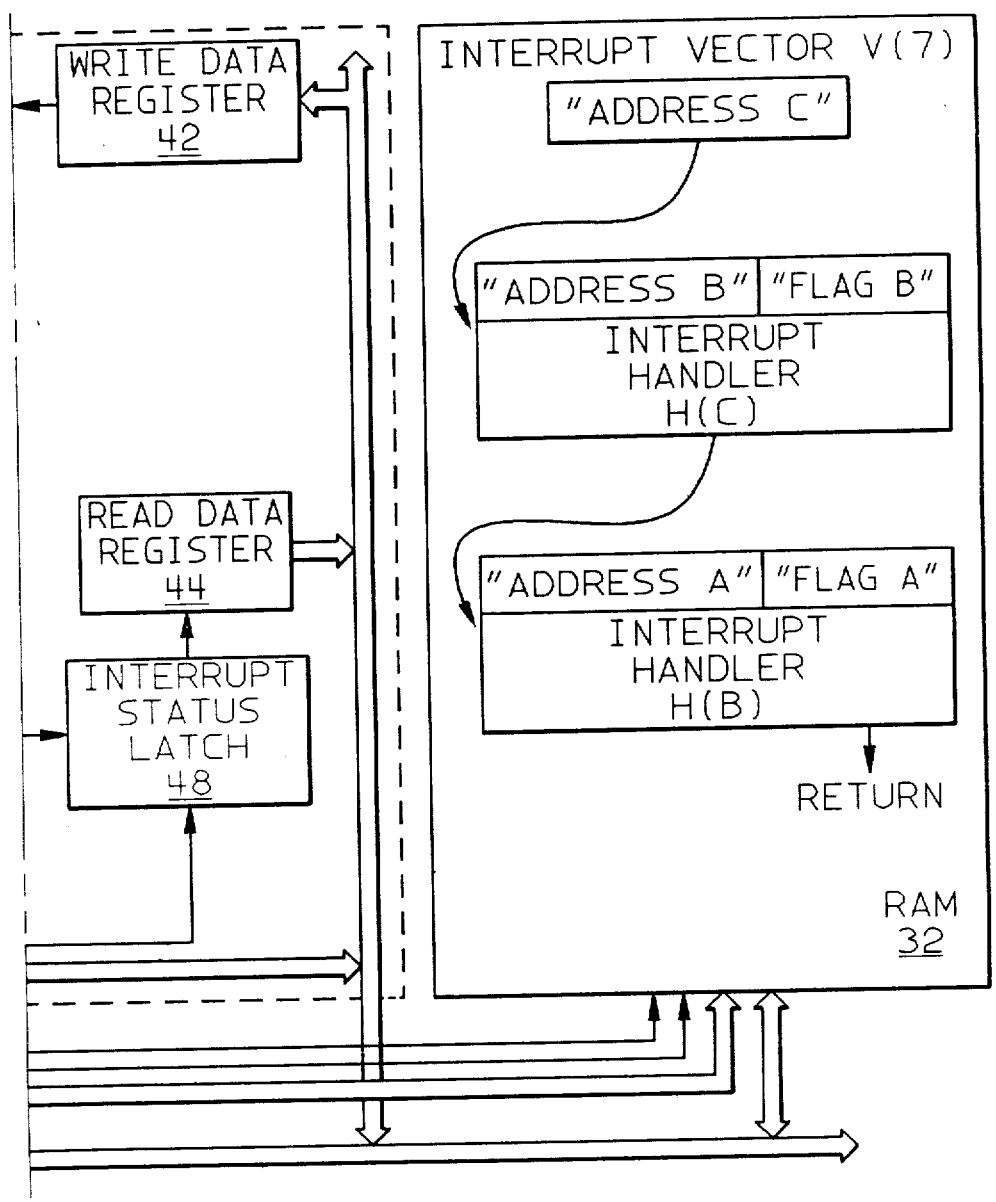
Figure 5:
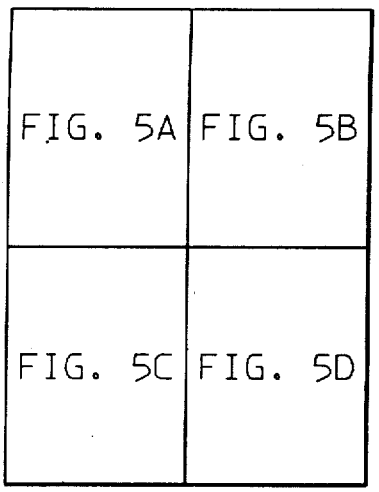
FIGS. 5, 5A, 5B, 5C and 5D are a diagram showing the relationship of several I/O devices 31, 33 and 35 which share the same interrupt line IRQ7 and their corresponding interrupt handlers H(A), H(B) and H(C) in the memory 32, in accordance with the invention.
Figure 5A:
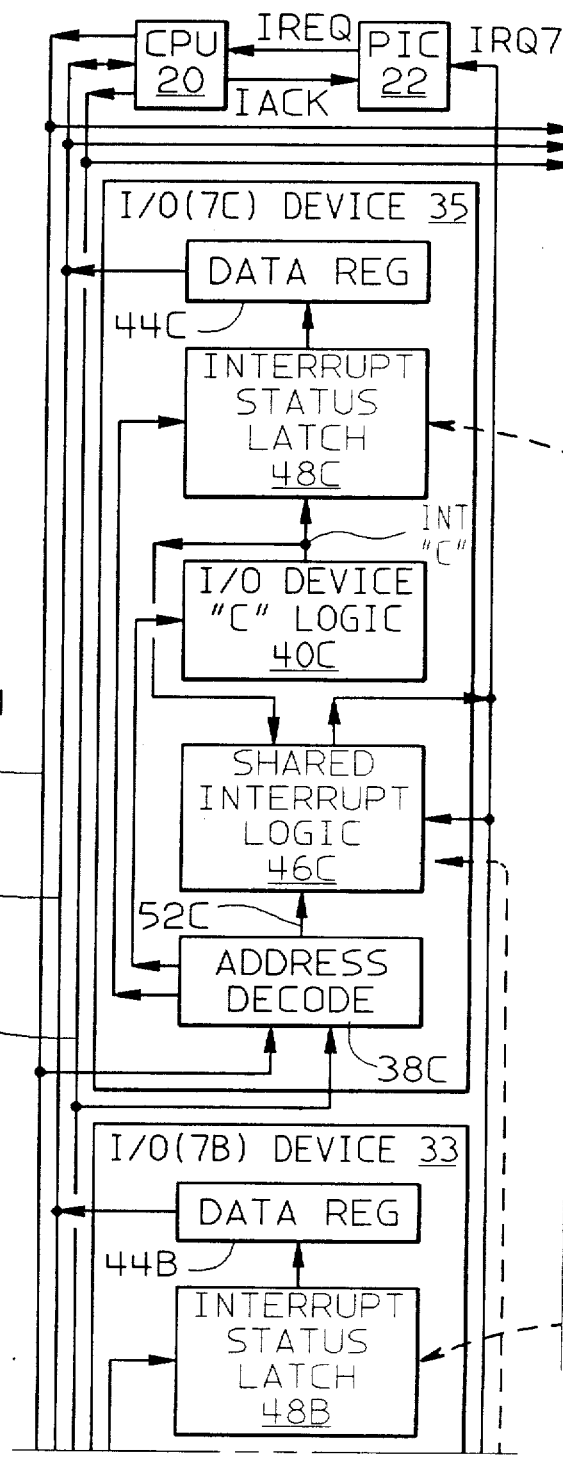
Figure 5B:
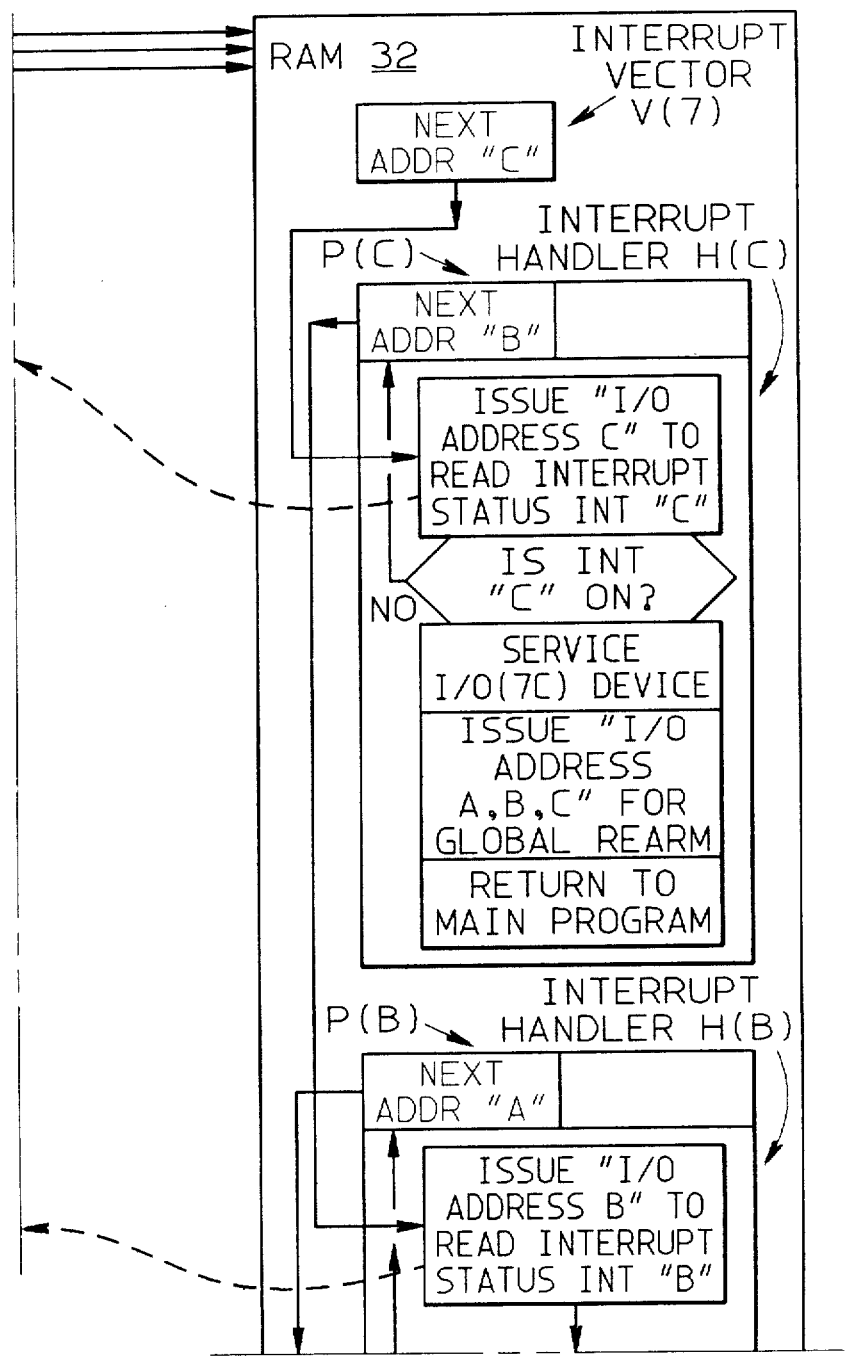
Figure 5C:
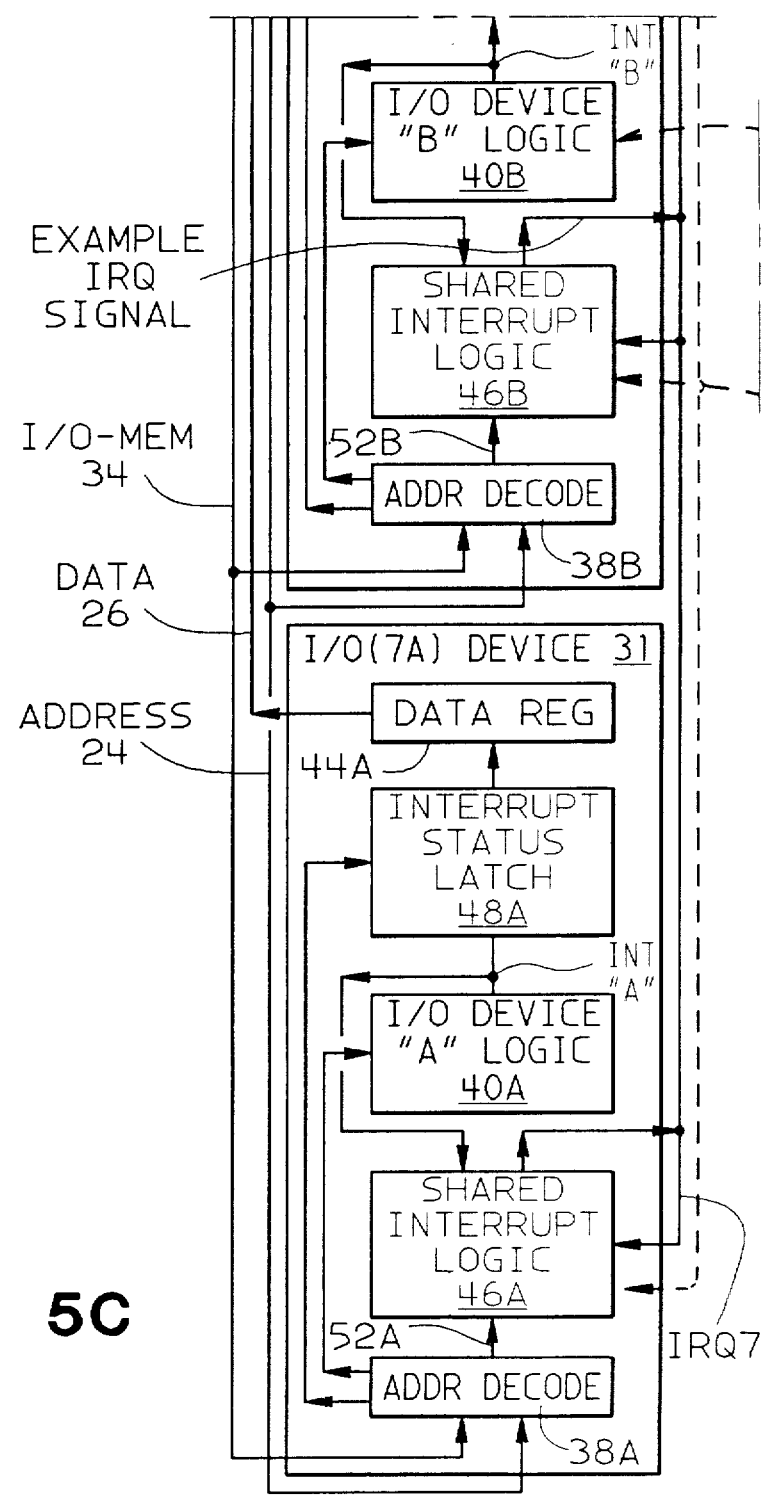
Figure 5D:
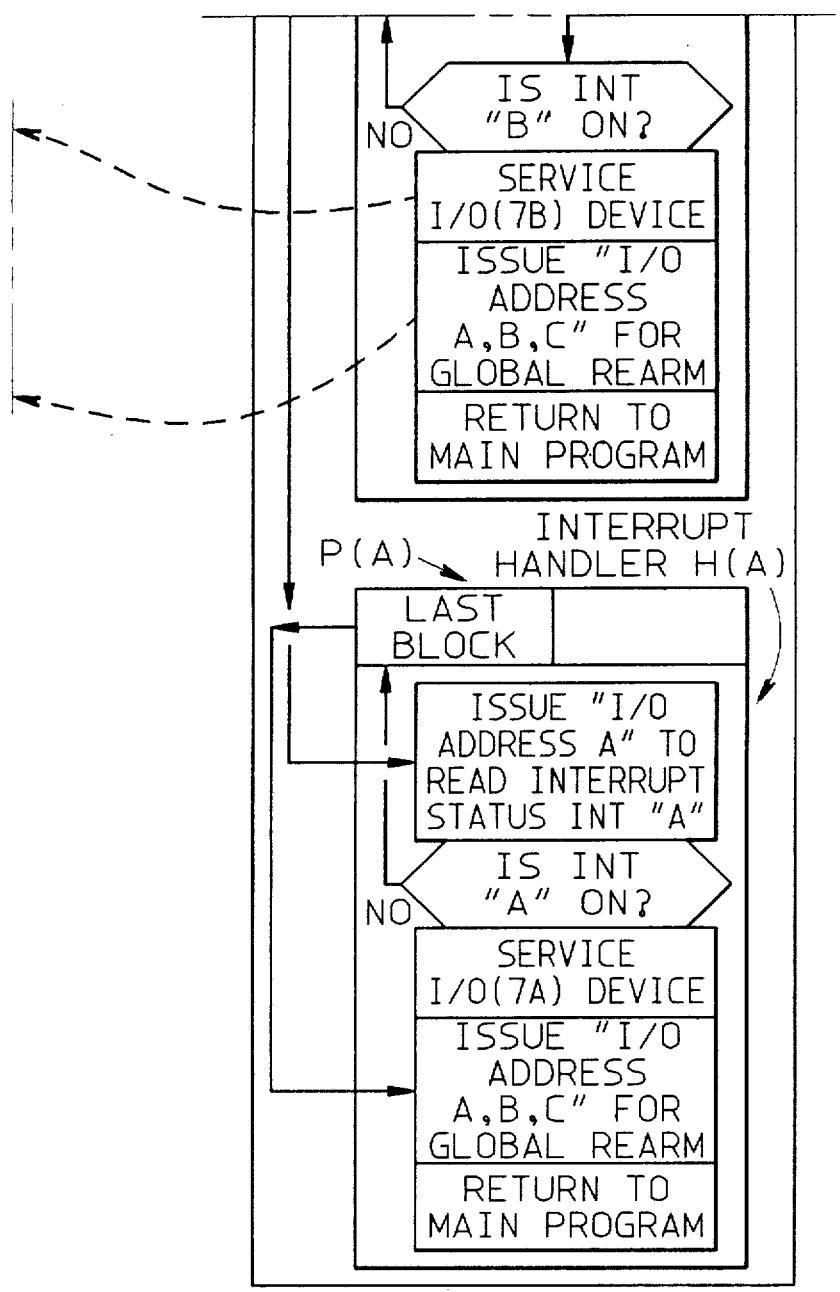

FIGS. 3, 4 and 5 show the relationship of several I/O devices 31, 33 and 35 which share the same interrupt line IRQ7 and their corresponding interrupt handlers H(A), H(B) and H(C) in the memory 32, in accordance with the invention.

Although the interrupt line IRQ7 has been chosen to illustrate the principle of interrupt sharing, another one of the interrupt lines could also have been selected. The prior art I/O devices 27 and 29 which attach to interrupt lines IRQ2 and IRQ6, respectively, operate by holding the interrupt line (IRQ2 or IRQ6)) at a low level and then drive the line high to cause an interrupt signal. In contrast, in the system disclosed herein, there is a shared interrupt logic unit 46 on each of a plurality of I/O devices 31, 33 and 35 sharing a single interrupt line IRQ7. The shared interrupt logic unit 46 allows the shared interrupt line IRQ7 to float to a high potential. This can be accomplished by pull-up resistors, for example, in each respective logic unit 46. Each I/O device 31, 33 and 35 sharing the interrupt line IRQ7 may cause an interrupt signal pulse on the shared interrupt line IRQ7 to a low potential level, using its respective shared interrupt logic unit 46. The leading edge of the pulse arms the programmable interrupt controller 22 and the trailing edge of the pulse signals the programmable interrupt controller 22 to cause the interrupt request to the CPU 20. The shared interrupt logic unit 46 on each I/O device 31, 33 and 35 must monitor the shared interrupt line IRQ7 for the occurrence of an interrupt signal from one of the I/O devices 31, 33 or 35 connected to the line. When any I/O device 31, 33 or 35 connected to the interrupt line IRQ7 drives the line to a low potential, the shared interrupt logic unit 46 on each respective I/O device 31, 33 and 35 connected to the line IRQ7, will prevent the issuing of any further interrupt signals until all of the shared interrupt logic units 46 on all of the I/O devices 31, 33 and 35 are rearmed by a global rearm signal on line 52.

Each shared interrupt logic unit 46 on each respective I/O device 31, 33 and 35 connected to the shared interrupt line IRQ7, includes an interrupt status bit INT stored in interrupt status latch 48 and an interrupt enable bit ENA stored in interrupt enable latch 50, which can be controlled and monitored by its corresponding interrupt handler routine H(A), H(B) or H(C), respectively. If the interrupt status bit INT for an I/O device 31, 33 or 35 is at a first binary state of "one" when the shared interrupt logic unit 46 is rearmed by line 52, the shared interrupt logic unit 46 reissues an interrupt signal on IRQ7. In this manner, the loss of interrupts is prevented if more than one of the I/O devices 31, 33 or 35 issue an interrupt signal during the same interval and an interrupt handler routine issues a global rearm signal after servicing one of the I/O devices.

Figure 6:
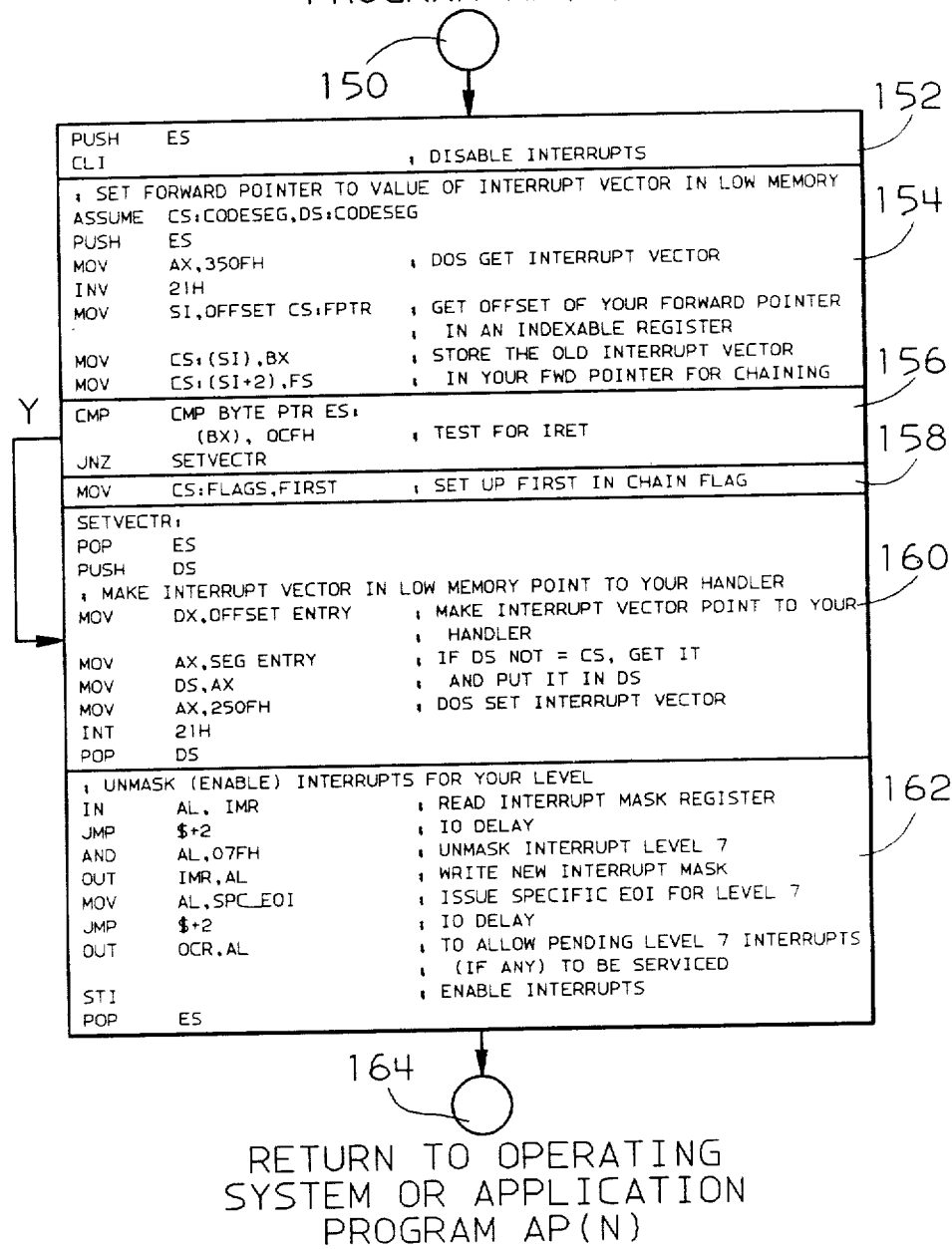
FIG. 6 is a flow diagram of the linking logic routine L(N) in accordance with the invention, including an example of its assembly language instructions.
Figure 7B:
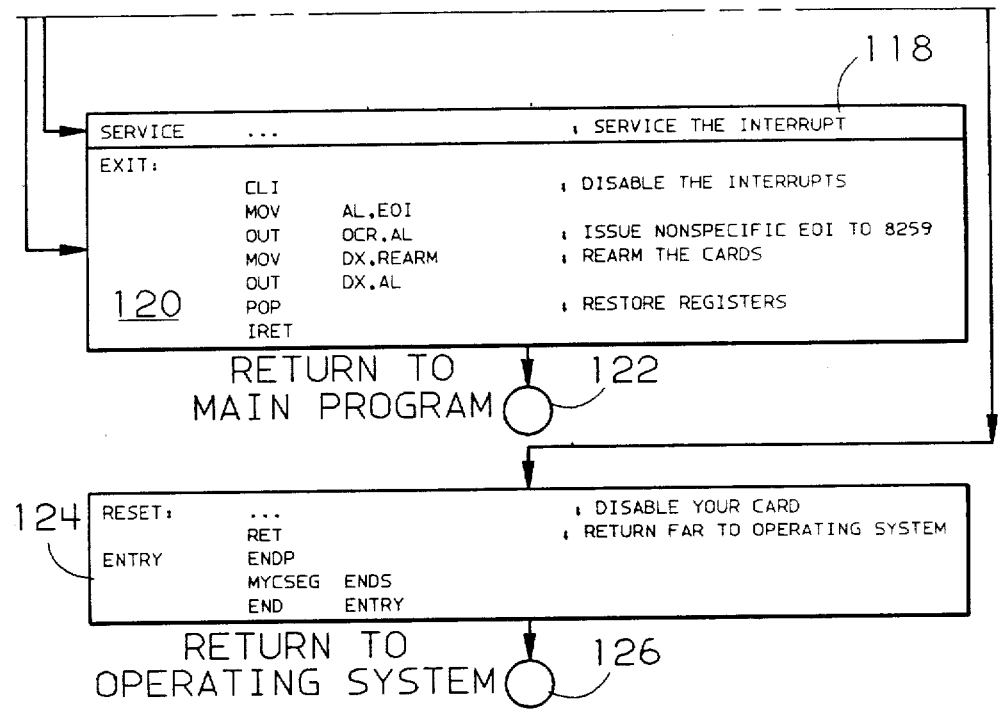
Figure 8B:
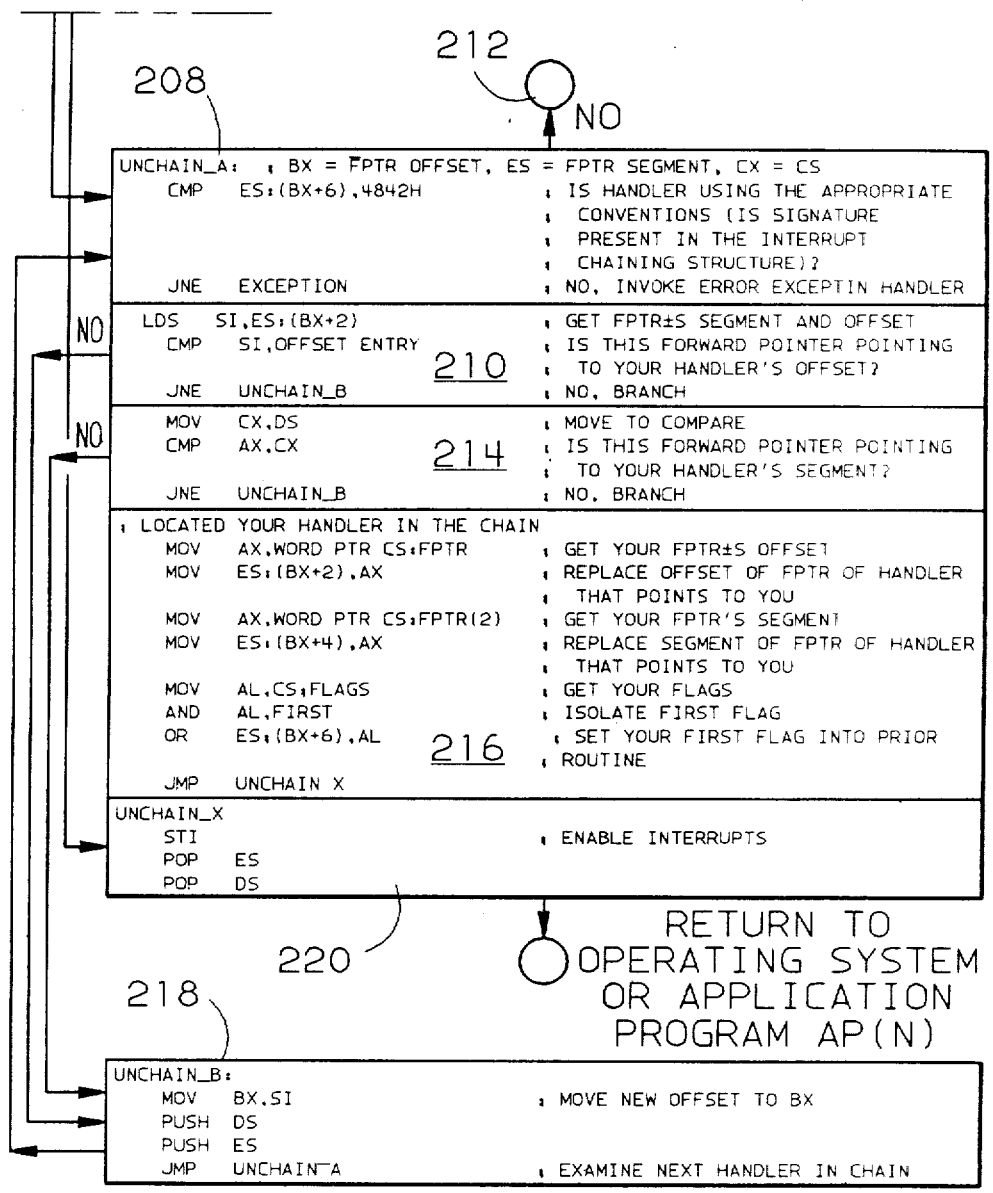
Figure 13:
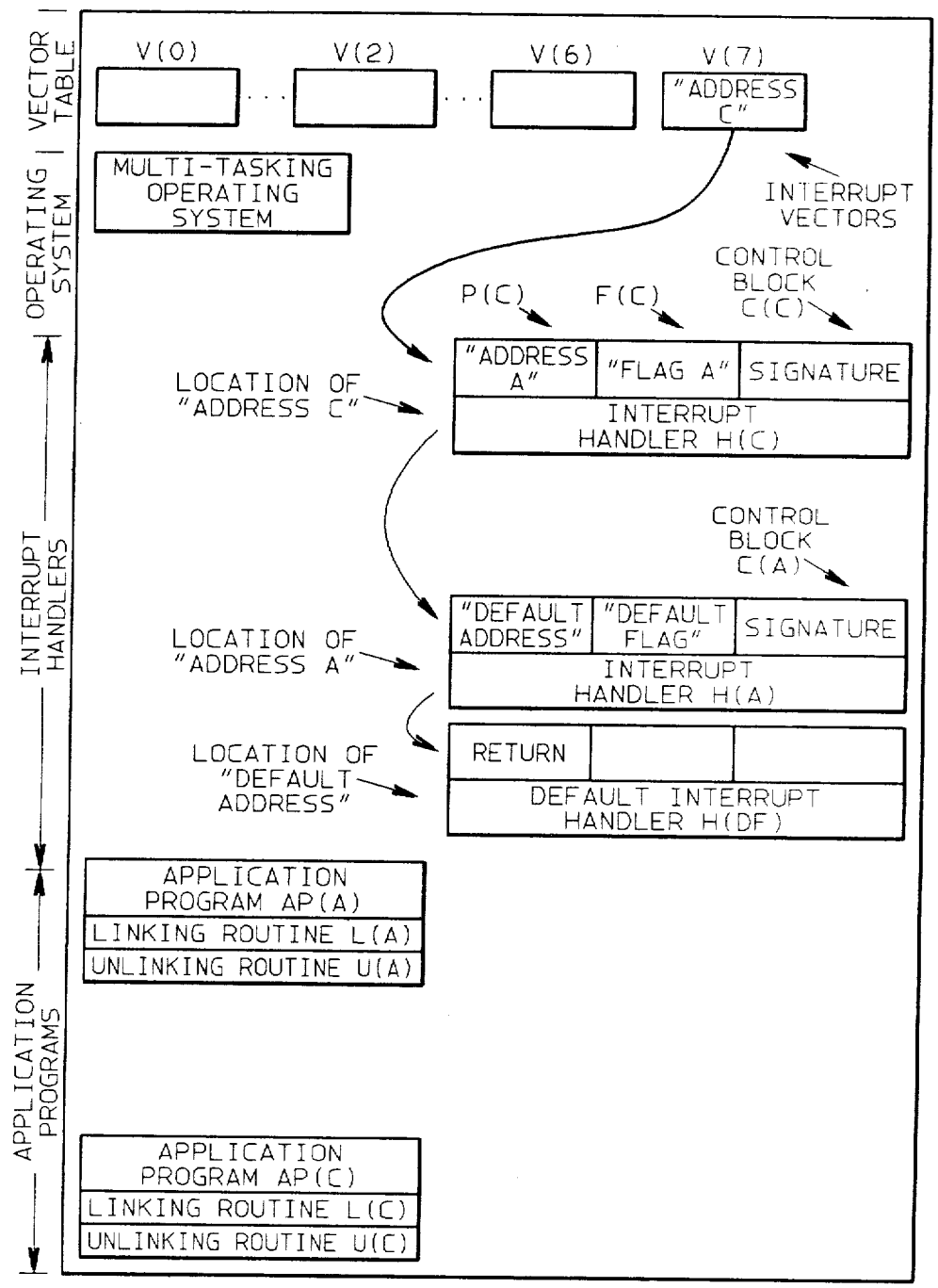
FIG. 13 is a memory map illustrating the unlinking of the interrupt handler H(B).
Figure 14:
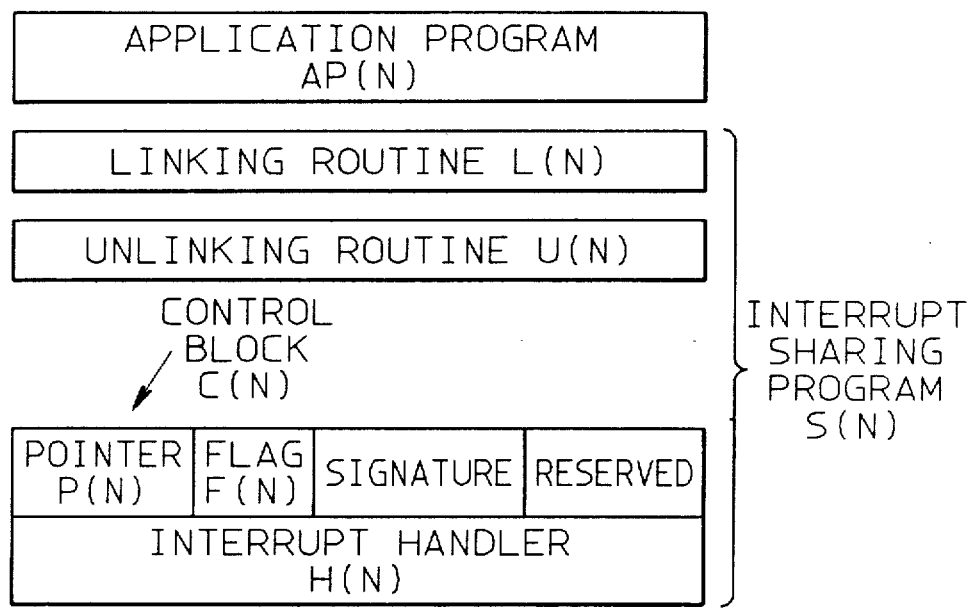
FIG. 14 is a schematic diagram of the software modules associated with an application "N" which makes use of an I/O device which shares an interrupt line with other I/O devices.

Whenever an application program AP(N) requires the use of the shared interrupt line IRQ7, it must be accompanied by an interrupt sharing program S(N), as shown in FIG. 14. (N is the identity of the application A, B, C, etc.) In accordance with the invention, the interrupt sharing program S(N) consists of three parts, the linking logic routine L(N) shown in FIG. 6, the interrupt handler routine H(N) shown in FIG. 7, and the unlinking logic routine U(N) shown in FIG. 8. The interrupt sharing program S(N) can be loaded when the application program AP(N) is loaded, and it can occupy a contiguous portion of the memory 32 or it can occupy another known position in the memory. FIGS. 6 and 9-12 show how the linking logic L(N) associated with each application program AP(N) requiring the use of the IRQ7 interrupt line, provides for an orderly method to link a newly loaded interrupt handler routine H(N) into a chain of previously loaded interrupt handler routines. FIGS. 5 and 7 show how the interrupt handler H(N) provides an orderly method to share the interrupt line IRQ7 while a given application program AP(N) is active. FIGS. 8 and 13 show how the unlinking logic U(N) provides an orderly means to unlink a particular interrupt handler routine H(N) from a chain of a plurality of interrupt handler routines, when the application program AP(N) corresponding to the particular interrupt handler routine H(N) is to be deactivated in a multitasking operating system environment.

Figure 11:
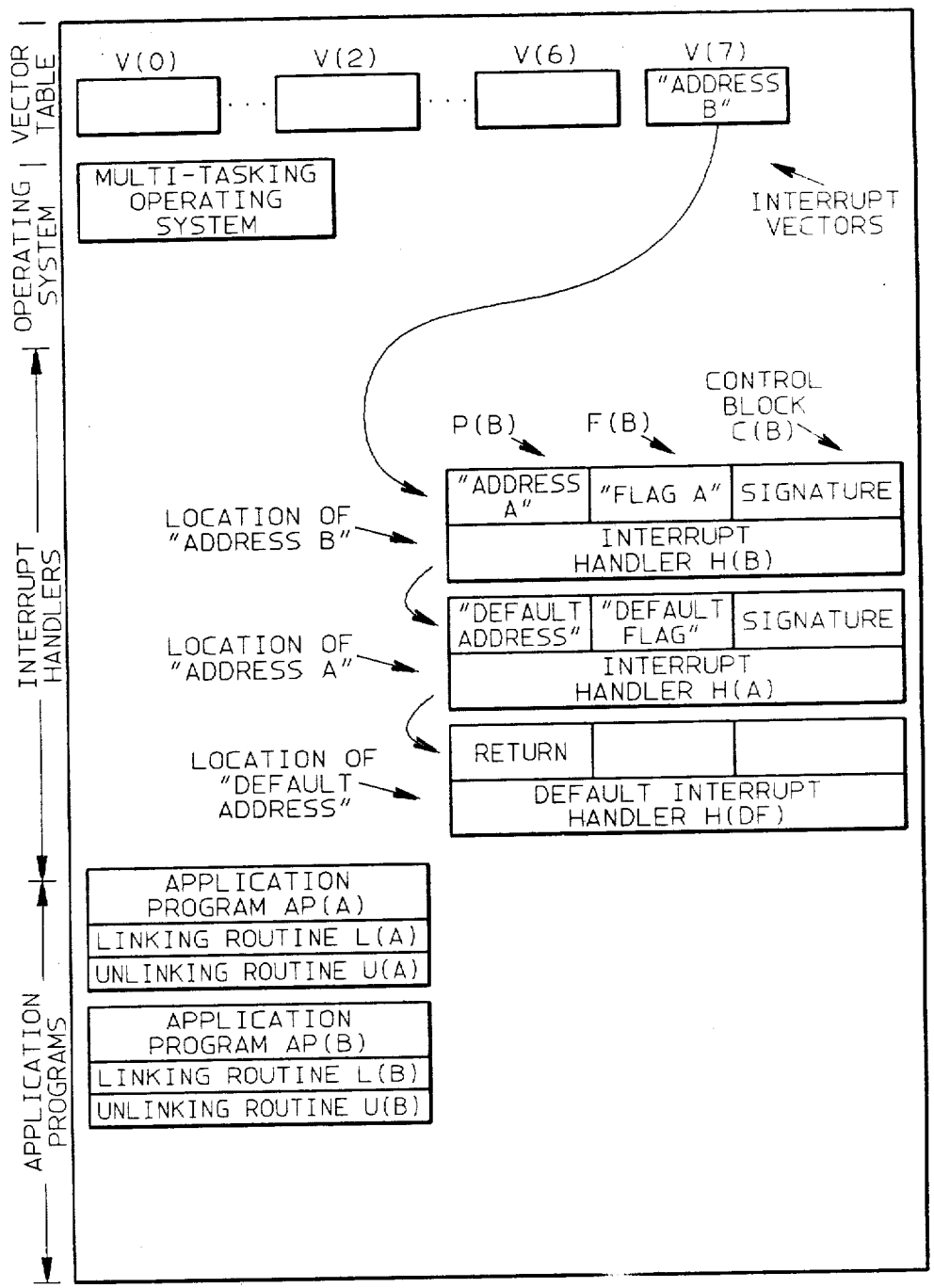
FIG. 11 is a memory map showing the linking of a second new interrupt handler H(B).

In accordance with the invention in the method shown in FIG. 11, of linking a newly loaded interrupt handler routine H(B) into a chain of previously loaded interrupt handler routines including H(A), the newly activated linking logic routine L(B) corresponding to the newly loaded interrupt handler routine H(B), replaces the existing contents ("Address A") in the interrupt vector V(7) in low memory with a pointer "Address B" to its own newly loaded interrupt handler routine H(B). The existing interrupt vector contents ("Address A") is used as a forward pointer address and is stored in pointer location P(B) in a control block C(B) at a fixed memory offset from the newly loaded interrupt handler routine H(B). FIG. 11 shows a control block C(A), C(B), etc. located at a fixed memory offset from each respective interrupt handler H(A), H(B), etc. Each control block C(N) includes a forward pointer address P(N), a flag F(N), and a signature field.

In accordance with the invention, in the method of sharing the interrupt level during ongoing operations, when interrupt handler routine H(B) for the newly loaded application program AP(B) gains control as a result of an interrupt signal on the shared interrupt line IRQ7, the newly loaded interrupt handler H(B) reads the contents of the interrupt status latch 48 for the corresponding I/O device 33 to determine if the corresponding I/O device 33 has caused the interrupt signal on the shared interrupt line IRQ7. If the corresponding I/O device 33 has caused the interrupt signal, the newly loaded interrupt handler routine H(B) services the interrupt, disables the interrupts by issuing a processor control instruction (CLI), issues a nonspecific end-of-interrupt (EOI) command to the programmable interrupt controller 22 when the interrupt handler routine H(B) has been completed, and then rearms the shared interrupt logic units 46 on all of the I/O devices 31, 33 and 35 sharing the interrupt line IRQ7. This is done by issuing a global rearm signal on line 52, accomplishing this by writing to a particular I/O address on bus 24 which is monitored by the shared interrupt logic units 46 on all of the I/O devices 31, 33 and 35 sharing the interrupt line IRQ7. Each I/O device 31, 33 and 35 decodes the address with its address decoder 38, which results in a global rearm signal being applied on line 52 to each I/O device 31, 33 and 35. The interrupt handler routine H(B) then issues a return from interrupt (IRET) instruction which transfers control back to the point of interruption in the main program. If, instead, the I/O device 33 corresponding to the newly loaded application program AP(B) did not cause the interrupt signal on the shared interrupt line IRQ7, then the newly loaded interrupt handler routine H(B) passes control to the next most recently loaded interrupt handler routine H(A) in the chain of interrupt handler routines shown in FIG. 5, making use of the forward pointer address ("Address A") which is stored in its pointer location P(B) at the fixed memory offset from the newly loaded interrupt handler routine H(B). A description of the instruction set for the Intel 8088 CPU 20 and Intel 8259 PIC 22, including the "CLI," "EOI" and "IRET" instructions, can be found in the iAPX 86, 88 *Users Manual* cited above.

In accordance with the invention, in the method shown in FIG. 13 to unlink a particular interrupt handler routine H(B) from the chain of interrupt handler routines H(A), H(B) and H(C), the unlinking logic routine U(B) must first locate the position of the interrupt handler routine H(B) within the chain. This is performed by starting at the interrupt vector V(7) in low memory and using the forward pointer P(N) for each consecutive interrupt handler routine H(N) to find the entry point for the next interrupt handler routine. As each interrupt handler routine in the chain is encountered (in the order H(C), H(B) and H(A), respectively), its identity is compared with the identity of the target interrupt handler H(B) to be deleted. This process is called traversing the chain. When the target interrupt handler routine H(B) is encountered in the chain, it is deleted by loading the forward pointer location P(C) of the previous interrupt handler routine H(C) in the chain with the forward pointer ("Address A") from the pointer location P(B) of the target interrupt handler routine H(B), thereby allowing the chain to skip around the deleted interrupt handler routine H(B).

Additional features of the invention include providing a characteristic signature, a duplicate copy of which is stored in each control block C(N) at a fixed memory offset from each interrupt handler routine H(N), and which is interrogated to determine if the interrupt handler chain has been corrupted. During the execution of the unlinking logic routine U(N), if it is discovered that the interrupt chain has been corrupted, an unlinking error recovery procedure can be invoked. An example of an error recovery procedure would be one that restores the original interrupt vector in low memory, and bypasses the corrupted portion of the interrupt handler chain.

In the microcomputer system shown in FIG. 3, the central processing unit 20 communicates with the RAM 32 and the I/O devices 27, 29, 31, 33 and 35 by means of the address bus 24, the data bus 26, the I/O-memory line 34 and the read/write line 36. An address issued by the central processing unit 20 over the address bus 24 will be designated as either destined for an I/O device if line 34 is in a first binary state or the address will be designated as destined for the RAM 32 if the line 34 is in a second binary state. If an address on the address bus 24 is destined for the RAM 32, the operation of reading data from the RAM 32 will be determined by a first binary state on the read/write line 36 and the operation of writing data into the RAM 32 will be established by a second binary state on line 36. Each of the I/O devices shown in FIG. 3 communicate their need for servicing by the CPU 20, by means of issuing an interrupt to the programmable interrupt controller 22, as described above. The I/O device 27 has the exclusive use of the IRQ2 interrupt line and the I/O device 29 has the exclusive use of the IRQ6 line. The I/O devices 31, 33 and 35 must share the IRQ7 line input to the programmable input controller 22. I/O device 31 has an interrupt handler routine H(A) in RAM 32 which handles interrupts issued by I/O device 31. I/O device 33 has interrupt handler routine H(B) in the RAM 32 which handles interrupts issued from I/O device 33. I/O device 35 has the interrupt handler routine H(C) in the RAM 32 which handles interrupts issued from the I/O device 35. In the illustration provided herein, the interrupt handler H(A) for I/O device 31 was loaded first, followed by the interrupt handler H(B) for the I/O device 33 which, in turn, was followed by lastly loading the interrupt handler H(C) for the I/O device 35. The interrupt vector V(7) in the RAM 32 has its contents point to the last loaded interrupt handler H(C). The pointer P(C) in the interrupt handler H(C), in turn, points to the second last loaded interrupt handler H(B). The pointer P(B) of the interrupt handler H(B), in turn, points to the first loaded interrupt handler H(A). The pointer P(A) of the interrupt handler H(A), in turn, points to the default interrupt state which effectively returns control to the main program which was interrupted. When any one of the three I/O devices 31, 33 or 35 issues an interrupt signal on the interrupt line IRQ7, the programmable interrupt controller 22 issues an interrupt request (IREQ) to the CPU 20, causing the main program currently executing in the CPU 20 to be interrupted. The CPU 20 then reads the contents of the interrupt vector V(7) and passes control to the interrupt handler H(C). The interrupt handler H(C) interrogates the I/O device 31 by means of the address bus 24 and the data bus 26, to determine whether the I/O device 31 issued the interrupt. If it is determined that the I/O device 31 did not issue the interrupt, the interrupt handler H(C) reads the contents of its pointer P(C) which points to the next interrupt handler in the chain H(B). The CPU 20 executes the interrupt handler routine for H(B), and interrogates the I/O device 33 over the address bus 24 and the data bus 26 to determine whether the I/O device 33 issued the interrupt. If the I/O device 33 is determined to have issued the interrupt signal on the IRQ7 interrupt line, then the interrupt handler routine H(B) services the interrupt by performing the task encoded in the interrupt handler H(B). This can involve for example, the transfer of a byte of received information from a communication line to which the I/O device 33 is attached, to a buffer which has been set aside in the RAM 32. After the completion of the service routine portion of the interrupt handler H(B), the interrupt condition is terminated and control in the CPU 20 is passed to the main program which was interrupted by the interrupt signal issued on the IRQ7 line.

FIG. 4 shows a detailed illustration of the I/O device 33. In this illustration, the I/O device 33 can be for example, a communication adapter which is connected to a communications line. The I/O device logic 40 represents the hardware and software logic which resides on the adapter card to carry out the various functions required to perform an asynchronous communications task. The I/O device logic 40 is connected to the data bus 26 as shown in FIG. 4. An address decoder 38 has inputs from the address bus 24, the I/O-memory line 34, and the read/write line 36. The address decoder 38 receives address information from the bus 24, decodes that information and transfers control signals to the I/O device logic 40 and to other portions of the I/O device 33. In accordance with the invention, the interrupt line IRQ7 is connected to the output of the shared interrupt logic unit 46 on the I/O device 33, as is shown in FIG. 4. The shared interrupt logic unit 46 has an input which is the global rearm line 52 output from the address decoder 38. The shared interrupt logic unit 46 has another input (INT) which is the interrupt signal emitted by the I/O device logic 40. The shared interrupt logic unit 46 has another input (ENA) which is output from an interrupt enable latch 50 which has an input connected to the address decoder 38 and a second input from a write data register 42 which is connected to the data bus 26. The I/O device 33 also has an interrupt status latch 48 which receives an input INT from the I/O device logic 40 and also receives a control input from the address decoder 38. The interrupt status latch 48 has an output connected to the read data register 44 which provides an output to the data bus 26.

The shared interrupt logic unit 46 has a first flip-flop 62 with a D input connected to the output of the AND gate 60. The AND gate 60 is a three input logical AND with inputs from the IRQ7 line, the ENA line, and the INT line. The clock input CK of the flip-flop 62 is connected to the system clock line output from the CPU 20. The Q output of the flip-flop 62 is connected to the D input of a second flip-flop 64. The CK input of the flip-flop 64 is also connected to the system clock line. The complementary Q* output of the flip-flop 64 is connected to a driver 66, the output of which drives the IRQ7 interrupt line. The shared interrupt logic unit 46 includes a third flip-flop 68 which has its D input connected to a positive DC potential and its CK input connected to the IRQ7 interrupt line. The complementary output Q* of the third flip-flop 68 is connected through the AND gate 70 to the CL input of both the first flip-flop 62 and the second flip-flop 64. The CL input of the flip-flop 68 is connected to the global rearm line 52 from the address decoder 38. The global rearm line 52 is the other input to AND gate 70. The flip-flops 62, 64 and 68 operate as follows. While the D input is at a high level, if the clock input CK goes high, the Q output assumes the high level and the Q* output assumes a low level. In this state, if the clear CL input goes low, the flip-flop is reset into the opposite state where the Q output is low and the Q* output is high. Alternately, while the D input is at a low potential, if the clock CK signal goes high, the Q output goes low and the Q* output goes high. In this state, if the clear CL input goes low, no change occurs to the flip-flop, the Q output remaining low and the Q* output remaining high.

The driver 66 is a tri-state driver which operates as follows. When the Q* output of the flip-flop 64 which is input to the driver 66, is high, the output of the driver 66 is in a high impedance state. That is, signals on the IRQ7 interrupt line effectively see a high impedance at the output of the driver 66. Alternately, when the Q* output of the flip-flop 64 which is applied to the input of the driver 66, is low, then the output of the driver 66 is also low. Thus, the IRQ7 line will remain in a low potential state for as long as the Q* output of the flip-flop 64 is in a low potential state.

The three flip-flops 62, 64 and 68 in the shared interrupt logic unit 46 are identical in their characteristics, each having a clear CL input which is set when a low potential is applied to the terminal. The global rearm line 52 output from the address decoder 38 is connected to the clear CL input of the flip-flop 68 and is connected to one of the inputs of the two input AND 70. The other input of the AND 70 is connected to the complementary Q* output of the flip-flop 68. The output of the AND 70 is connected to the clear CL input for the flip-flop 62 and the clear CL input for the flip-flop 64. The global rearm signal output from the address decoder 38 is a relatively low potential which is applied to the clear CL input for the flip-flop 68, forcing the flip-flop 68 into its clear state which results in a relatively high potential output on the complementary Q* output for the flip-flop 68 which is applied to one of the inputs of the AND 70. However, as long as the global rearm signal on line 52 is active and at the relatively low potential, the AND logical function for the AND gate 70 is not satisfied and therefore the output of the AND gate remains at a relatively low potential, maintaining the clear CL inputs to the flip-flops 62 and 64 at the relatively low potential. Thus, as long as the global rearm signal on line 52 is active in its relatively low potential, the Q* complementary output for the flip-flop 64 remains forced into its high potential state, causing the tri-state driver 66 to remain in its high impedance state with respect to the interrupt line IRQ7. It is only when the global rearm signal on line 52 is completed and line 52 rises to the relatively high potential state, will the AND gate 70 be satisfied and thereby apply a relatively positive potential to the clear CL inputs for the flip-flops 62 and 64, unlocking those flip-flops. After the flip-flops 62 and 64 are unlocked, they can then respond to any pending interrupt states which are transferred by the AND gate 60 to the flip-flops 62 and 64. In this manner, the flip-flops 62 and 64 will not be prematurely unlocked while an unusually long duration global rearm signal is still active on line 52.

When the application software AP(B) was loaded into the RAM 32, as shown in FIG. 11, one of the initialization tasks it performed was to enable the shared interrupt logic unit 46 on the I/O device 33 by setting the enable bit ENA in the interrupt enable latch 50. This was performed at the time AP(B) was loaded, by the AP(B) program issuing an OUT command to the CPU 20, causing the I/O address to be output on the address bus 24 to the I/O device 33 and causing the enable data to be output on the data bus 26 to the I/O device 33. The address output on the address bus 24 is decoded by the address decoder 38 which outputs a control signal to the interrupt enable latch 50. The data output on the data bus 36 is loaded into the write data register 42 which, in turn, outputs a signal to the interrupt enable latch 50. This condition sets the interrupt enable latch 50 and turns on the ENA enable line which is one of the three inputs to the AND gate 60 in the shared interrupt logic unit 46. This enables the shared interrupt logic unit 46 on the I/O device 33 so that it can participate in sharing the IRQ7 line with other I/O devices in the system.

In the instant example where the I/O device 33 is considered to be an asynchronous communications adapter, when a byte of information is received from a communications medium by the I/O device logic 40, the logic 40 outputs an INT interrupt signal which is applied to one of the inputs of the AND gate 60. The INT signal is also applied to the interrupt status latch 48 on the I/O device 33. It will be recalled that the signaling convention applied to the IRQ7 line is that the potential of the interrupt line being shared will be allowed to float to a relatively high potential during its quiescent state and that the existence of an interrupt condition will be signaled by a negative going transition in the potential of the line. Thus, if the IRQ7 interrupt line is in its quiescent state, the third input to the AND gate 60 will be positive. Since the enable bit ENA is positive and the interrupt signal INT has just gone positive, the AND gate 60 applies a positive potential to the D input of the flip-flop 62. At the next positive clock pulse from the system clock line, the CK input of the flip-flop 62 goes positive and thus the Q output of flip-flop 62 goes positive and is applied to the D input of the flip-flop 64. At the rising edge of a next clock signal on the system clock line, the CK input to the second flip-flop 64 goes positive and sets the flip-flop 64. This causes the complementary Q* output of the flip-flop 64 to go to a low state. The tri-state driver 66 senses the low state on its input and applies a low potential to the IRQ7 line at its output for a duration equal to the low state being applied to the input of the driver 66.

The interrupt request register in the programmable interrupt controller 22 has its input connected to the IRQ7 line and senses when the interrupt line undergoes the negative transition indicating an interrupt signal. The programmable interrupt controller 22 will issue an interrupt request IREQ to the CPU 20, as previously described.

The IRQ7 interrupt line is connected as one of the three inputs to the AND gate 60 in the shared interrupt logic unit 46. Since the IRQ7 line has now gone low, having been driven low by the driver 66, the AND condition is no longer satisfied for the AND gate 60, and therefore a relatively low potential is applied to the D input of the flip-flop 62. At the next rising edge of the system clock, the CK input of the flip-flop 62 goes positive and transfers the relatively low potential of the D input for flip-flop 62 to the Q output. On the next rising edge of the system clock, since the D input for the flip-flop 64 is now at a low potential, when the CK input to the flip-flop 64 goes positive, the complementary Q* output goes positive, thereby removing the low potential applied by the driver 66 to the IRQ7 line, and replacing it by a high impedance state. Thus, the net effect is that the IRQ7 line is driven to a low potential for two clock cycles in response to the issuance of an interrupt INT signal from the I/O device logic 40, followed by the return of the IRQ7 line to its quiescent, relatively high potential state.

A lockout feature is provided by the flip-flop 68 in the shared interrupt logic unit 46. The clear state for the two flip-flops 62 and 64 is achieved by applying a low potential to the CL input which results in the complementary Q* output going positive and the Q OUT going to a low potential. The clear state for the flip-flop 68 also results in the complementary Q* output going positive, and is achieved by applying a positive going signal to CL on the flip-flop 68. It can be considered that when the clear state is applied to any one of the flip-flops, that flip-flop is locked into the condition where the Q* output is positive and cannot be overridden by clock pulses applied to the CK input of that flip-flop. The lockout mechanism for the shared interrupt logic unit 46 operates as follows. At the end of the interval for the interrupt signal on the IRQ7 line, the potential of the IRQ7 line is rising from its low potential to a high potential. This rising edge signal on the IRQ7 line is applied to the CK input of the flip-flop 68. Since the D input to the flip-flop 68 is connected to a positive DC potential, the complementary Q* output of the flip-flop 68 goes low and this low signal is applied to the CL inputs of the flip-flops 62 and 64 through the AND gate 70. Since the flip-flops 62 and 64 are connected so that a low signal places the flip-flop in a clear state, the flip-flops 62 and 64 are effectively locked into the clear state with the Q* output of the flip-flop 64 maintaining a relatively positive potential. This relatively positive potential maintains the tri-state driver 66 in a high impedance condition, as seen by the IRQ7 line. This situation obtains for every shared interrupt logic unit 46 on every I/O device 31, 33 and 35 which shares the IRQ7 interrupt line. Thus, the IRQ7 interrupt line will remain quiescent in its positive state because the tri-state drivers 66 on each I/O device 33 is locked into its high impedance state.

The locked out condition for all of the shared interrupt logic units 46 will be maintained while the interrupt is being serviced. The programmable interrupt controller 22, after having sensed the interrupt signal on the IRQ7 line, outputs an interrupt request signal IREQ to the CPU 20 to request servicing the interrupt. The CPU 20 will terminate the existing main program being executed, will store away the current instruction pointer, flags, and working register contents, and then it will acknowledge by means of the IACK line, to the programmable interrupt controller that it is starting an interrupt condition. The programmable interrupt controller 22 will then issue the address of the interrupt vector V(7) corresponding to the IRQ7 line. The CPU 20 will access the RAM 32 at the interrupt vector address and will read the contents of the interrupt vector, which is the address of the most recent interrupt handler loaded into the RAM 32. In our present illustration, three interrupt handlers have been loaded into the RAM 32 which service I/O devices 31, 33 and 35 sharing the interrupt line IRQ7. The contents of the interrupt vector V(7) is the address of the most recently loaded interrupt handler H(C) which is the interrupt handler for the I/O device 35. The location pointed to by the contents of the interrupt vector V(7) is the beginning of the executable code for the interrupt handler H(C). The instruction pointer in the CPU 20 is set to the first instruction in the code for the interrupt handler H(C) and the CPU 20 commences to execute that code. An example of an interrupt handler routine is shown in Table I. The initial portion of the interrupt handler code instructs the CPU 20 to read the interrupt status latch 48 for the I/O device 35 to determine whether it was the I/O device 35 which issued the interrupt on the IRQ7 interrupt line. Since the interrupt status latch for the I/O device 35 indicates that device did not issue the interrupt, then the interrupt handler H(C) must pass control to the next most recently loaded interrupt handler H(B) which services the I/O device 33. This transfer of control from the interrupt handler H(C) is accomplished by reading the contents of the pointer P(C) which is located at a fixed memory offset from the starting point for the executable code for the interrupt handler H(C). The contents of the pointer P(C) is the address of the starting point for the executable code for the next most recently loaded interrupt handler H(B). This address is loaded into the instruction pointer for the CPU 20, which starts the execution of the interrupt handler H(B).

The interrupt handler H(B) reads the interrupt status latch 48 on the I/O device 33 to determine whether it was this device which issued the interrupt. Since the I/O device logic 40 on the I/O device 33 turned on the INT bit when it issued the interrupt, the interrupt status latch 48 returns the information to the CPU 20 that it was in fact the I/O device 33 which issued the interrupt. The interrupt handler H(B) then commences to service the interrupt by executing the code which carries out the task which has been called for by the I/O device 33. In this example, since we are treating the I/O device 33 as an asynchronous communications adapter, the interrupt handler H(B) will proceed to transfer a received byte of data from the communications port in the I/O device logic 40 on the I/O device 33, to a reserved buffer space in the RAM 32. At the completion of this service routine by the interrupt handler H(B), the interrupt handler H(B) proceeds to issue a sequence of commands which completes the interrupt condition. These commands disable the interrupts by issuing a processor control instruction (CLI), issues a nonspecific end-of-interrupt command (EOI) to the programmable interrupt controller 22, and then rearms the shared interrupt logic units 46 on all of the I/O devices 31, 33 and 35 by issuing a global rearm signal. The global rearm signal is issued by the CPU 20 writing to a particular I/O address on the address bus 24 which is monitored by the address decoders 38 on all of the I/O devices 31, 33 and 35. Each address decoder 38 decodes this special address, which results in a global rearm signal being applied on line 52 as a negative going signal to the clear CL input of the flip-flop 68 of the shared interrupt logic unit 46 for each I/O device 31, 33 and 35. The interrupt handler routine then issues a return-from-interrupt (IRET) instruction which transfers control back to the point of interruption in the main program.

The global rearm signal 52 is a negative going signal which is applied to the clear CL input of the flip-flop 68. This causes the complementary Q* output of the flip-flop 68 to go positive and that positive signal is applied through the AND gate 70 to the clear CL inputs for the flip-flops 62 and 64. Recall that the clear CL inputs for the flip-flops 62 and 64 are set to the clear state by a negative signal. The positive going signal applied to the CL inputs for the flip-flops 62 and 64, unlocks the flip-flops 62 and 64 so that they are now ready to process another interrupt INT signal issued by the I/O device logic 40.

Thus it is seen how the single interrupt line IRQ7 can be shared by three I/O devices 31, 33 and 35, each of which are respectively serviced by three interrupt handlers H(A), H(B) and H(C) which are consecutively chained in a linked list which is addressed by the interrupt vector V(7).

If any of the other devices, I/O device 31, for example, had its I/O device logic 40 issue an interrupt INT bit during the interval when the I/O device 33 was being serviced, then immediately following the issuance of the global rearm signal unlocking the flip-flops 62 and 64 after the completion of the servicing of the I/O device 33, the AND gate 60 in the shared interrupt logic unit 46 for the I/O device 31 will have its logical condition satisfied and the shared interrupt logic unit 46 on the I/O device 31 will commence to issue an interrupt signal on the IRQ7 line to initiate the servicing of the second interrupt called for by the I/O device 31. In this manner, interrupts that were delayed or blocked by the servicing of the interrupt for the I/O device 33 can now be serviced in their turn.

The relationship of the I/O devices 31, 33 and 35 with their respective interrupt handlers H(A), H(B) and H(C) can be seen with reference to FIG. 5. FIG. 5 shows the three I/O devices 31, 33 and 35 spatially arranged to correspond to their respective interrupt handlers H(A), H(B) and H(C) resident in the RAM 32. This depiction is arranged to assist the reader in understanding the operation of searching through the chain of interrupt handlers to find the particular interrupt handler which will service the I/O device which has issued the interrupt signal on the IRQ7 line. As in the preceding example, assume that the I/O device logic 40B on I/O device 33 has set the INT "B" bit on. The shared interrupt logic unit 46B has been monitoring the state of the IRQ7 line and during the current quiescent state of the line, the shared interrupt logic unit 46B issues an interrupt signal on the IRQ7 line to the programmable interrupt controller 22. The programmable interrupt controller 22, in turn, issues an interrupt request IREQ signal to the CPU 20 causing the CPU 20 to interrupt the currently executing main program, preserve current status values, and issue an interrupt acknowledge signal IACK to the programmable interrupt controller 22. The programmable interrupt controller 22 then outputs the memory address for the interrupt vector V(7), enabling the CPU to access the contents of the interrupt vector V(7), which is the address pointing to the beginning of the executable code for the most recently loaded interrupt handler H(C). As can be seen in FIG. 5, the spatial arrangement of the interrupt handler H(C) corresponds to the I/O device 35. The interrupt handler H(C) starts execution by issuing an "I/O address C" to enable the CPU 20 to read the interrupt status of the interrupt status latch 48C so as to determine whether the interrupt bit INT "C" has been set by the I/O device logic 40C on the I/O device 35. As can be seen in the flow diagram depicted in the interrupt handler H(C) of FIG. 5, a decision point is reached where the interrupt bit INT "C" is evaluated to determine if it is on or off. If INT "C" were on, then the interrupt handler H(C) would service the interrupt on the I/O device 35. However, in this example, it was not the I/O device 35 which issued the interrupt signal. Therefore, the decision point within the interrupt handler H(C) of FIG. 5 determines that INT "C" is off, and therefore the contents of the pointer P(C) which is located at a fixed memory offset from the beginning of the executable code for the interrupt handler H(C), is accessed by the CPU 20 and is loaded into the instruction pointer so that the interrupt handler H(B) will next be executed.

The spatial arrangement of the I/O device 33 in FIG. 5 is arranged to be proximate to the depicted location of the interrupt handler H(B) in the RAM 32 to show their mutual relationship. The code of the interrupt handler H(B) commences execution in the CPU 20 by issuing an "I/O address B" to read the interrupt status latch 48B on the I/O device 33, which has stored the state of the INT "B" bit which is set by the I/O device logic 40B on the I/O device 33. In this example, it is the I/O device logic 40B on the I/O device 33 which has initiated the current interrupt. Therefore, the value of INT "B" which is returned to the CPU 20 indicates the on-state for the interrupt bit. The interrupt handler H(B) determines the on-state for INT "B" in its decision point shown in the flow diagram for interrupt handler H(B) in FIG. 5. Since INT "B" is in its on state, the flow diagram for the interrupt handler H(B) shows that the interrupt handler commences to execute the service routine portion of the code to carry out the task requested by the I/O device logic 40B on the I/O device 33. After the CPU 20 completes the execution of the service routine portion of the interrupt handler H(B), the flow diagram for the interrupt handler H(B) shows that the interrupt handler issues a global rearm signal by causing the CPU 20 to output an "I/O address A, B, C" which is output on the address bus 24 to all of the I/O devices 31, 33 and 35 and which is received by the address decoders, 38A, 38B and 38C on the I/O devices 31, 33 and 35, respectively. The address decoders 38A, 38B and 38C decode the "I/O address A, B, C" and respectively output a rearm signal 52A, 52B and 52C to the shared interrupt logic 46A, 46B and 46C on respective I/O devices 31, 33 and 35. The effect of the rearm signal 52A, 52B and 52C on the respective I/O devices is to unlock the shared interrupt logic units 46A, 46B and 46C, as previously described. This enables the respective shared interrupt logic units 46A, 46B and 46C to detect succeeding interrupt bits INT "A," INT "B" and INT "C" respectively on the respective I/O devices 31, 33 and 35. The flow diagram for the interrupt handler H(B) in FIG. 5 now returns the CPU 20 to the main program at the point where execution was interrupted. The main program execution is resumed after reinstating the control status of the CPU 20 at the time it was interrupted by the I/O device 33.

Thus it can be seen that there is a direct affiliation between the respective interrupt handlers H(A), H(B) and H(C) in the RAM 32, which correspond respectively to the I/O devices 31, 33 and 35 which share the interrupt line IRQ7.

Table I is an example of the interrupt handler, H(N), Table II is an example of the linking routine L(N), and Table III is an example of the unlinking routine U(N). Tables I, II and III are written in assembler language for the IBM Personal Computer. The assembler language is a symbolic language in which every operation code is written in easily remembered symbolic letters called mnemonics. The assembler language of Table I resembles machine language in form and content and is made up of statements that represent instructions and comments. The instruction statements are the working part of the language and are divided into machine instructions, assembler instructions, macro instructions and pseudo operations. The machine instructions are the symbolic representation of the hardware instructions in the assembler's instruction set. The assembler instructions are requests to the assembler program to perform certain operations during the assembly of a source module. The macro instructions are requests to the assembler program to process a predefined sequence of code. From this sequence, the assembler generates source instructions, which it then processes as if they were part of the original input in the source module. Pseudo operations tell the assembler what to do with data, conditional branches, macros and listings, however they usually do not produce machine language code. A complete explanation of the instructions shown in Table I can be found in "Macro Assembler by Microsoft," *IBM Personal Computer—Computer Language Series,* 1981, published by the International Business Machines Corporation. FIG. 6 is a flow diagram of the linking routine L(N) code of Table II, FIG. 7 is a flow diagram of the interrupt handler H(N) code of Table I, and FIG. 8 is a flow diagram of the unlinking routine U(N) code of Table III.

The interrupt handler H(N) is represented in the flow diagram of FIG. 7, with assembler language instructions corresponding to each principal step. Entry point 100 for the flow diagram of FIG. 7 is from the interrupt vector V(7) or alternately from the prior interrupt handler in the chain. Step 102 in the flow diagram of FIG. 7 is the entry point for the handler and consists of a short jump (JMP) around the control block C(N) 104. The short jump instruction (JMP) in the entry block 102 is two bytes long and therefore the fixed offset of the forward pointer (FPTR) in the control block C(N) is two bytes beyond the entry point 102 for the interrupt handler. The reason for sandwiching the control block C(N) between the entry point 102 and the actual start of the interrupt handler code at step 110, is to insure that the control block 104 remains in a contiguous position with the interrupt handler when stored in the memory 32. Since the control block C(N) is 16 bytes long, the forward pointer (FPTR) in step 104 is 16 bytes lower in memory than the actual start of the interrupt handler code in step 110. For the purpose of enabling easy access by the unlinking code U(N) of the forward pointer (FPTR) in step 104 of an interrupt handler H(N), the fixed offset of a positive two bytes from the entry point at step 102 is maintained for all interrupt handlers in the interrupt chain. In the process of searching for the correct interrupt handler to service a particular interrupt issued by an I/O device, step 102 passes to step 110 in FIG. 7, which represents the actual start of the interrupt handler code. In step 110, existing registers in the CPU 20 are saved and then the interrupt status latch 48 on the corresponding I/O device is read. A test is then conducted in step 110 to determine if the target I/O device actually caused the interrupt. If the target I/O device caused the interrupt, then a branch instruction (JNZ) branches to step 118 which contains the instructions to service the interrupt. After the interrupt servicing has been completed in step 118, step 118 passes to step 120 which conducts the exiting procedure to exit from the chain. In step 120, the interrupts are disabled, a nonspecific end-of-interrupt command is sent to the programmable interrupt controller 22, and then the global rearm message is sent out over the bus 24 to all I/O devices sharing the interrupt line, causing the shared interrupt logic units on each respective I/O device to return to the unlocked state to enable them to service subsequent interrupts. Then, step 120 restores the prior state of the registers in the CPU 20. Step 120 then passes to the exit point 122 which returns to the main program which had been interrupted.

Alternately, if, in step 110, the tests determine that the I/O device corresponding to the interrupt handler H(N) did not issue the interrupt, then step 110 passes to step 112 to determine whether this particular interrupt handler was the first interrupt handler to be loaded, or stated otherwise, is it the last interrupt handler in the chain. If it is the last interrupt handler in the chain, then none of the I/O devices interrogated by their respective interrupt handlers in the chain, issued the interrupt. This poses a problem because a global rearm message must be sent out to all I/O devices to unlock their respective shared interrupt logic units. Step 112 solves this problem by jumping (JNZ) to step 120 which will carry out the exit operation to exit from the chain, including the issuing of a global rearm signal.

Reference is now made to the linking routine L(N) flow diagram of FIG. 6. Each major step shown in the flow diagram of FIG. 6 contains example assembly language instructions for carrying out the step. When the operating system or alternately the application program AP(N) requires the linking of the interrupt handler H(N) into the chain of interrupt handlers, the operating system or the application program AP(N) passes to the entry point 150 of the flow diagram of FIG. 6. The entry point 150 passes to the first step 152 which carries out the function of disabling the interrupts. Step 152 passes to step 154 which carries out the process of setting the forward pointer F(N) for the interrupt handler H(N), to equal the value of the contents of the interrupt vector V(7). Step 154 then passes to step 156 where a test is conducted to determine if the existing interrupt handler, which had been pointed to by the existing contents of the interrupt vector V(7), was in fact an interrupt return instruction (IRET). If in fact it was an interrupt return instruction, then that existing interrupt handler was the default interrupt handler initially set up by DOS. In this case, the new interrupt handler H(N) now being linked into the chain, will be a first non-default interrupt handler in the chain, and therefore its flag byte must be set to indicate this condition. The compare instruction (CMP) in step 156 is satisfied and therefore the jump-if-not zero (JNZ) instruction in step 156 causes step 156 to pass to step 158 where the flag byte F(N) is set to indicate that the interrupt vector H(N) now being linked into the chain, is the first interrupt vector in the chain. Step 158 then passes to step 160. Alternately, if step 156 determines that the interrupt handler H(N) is not the first in the chain, then step 156 passes directly to step 160. Step 160 loads the address of the entry point for the interrupt handler H(N) into the location of the interrupt vector V(7). Thus, when an interrupt signal occurs on the interrupt line IRQ7, when the CPU 20 accesses the interrupt vector V(7), the first interrupt handler in the chain to be executed will be the most recently linked interrupt handler H(N). In the flow diagram of FIG. 6, step 160 then passes to step 162 where the interrupts for the interrupt level IRQ7 are unmasked. Step 162 then passes to the exit point 164 which returns control to the operating system or alternately to the application program AP(N).

The flow diagram of FIG. 8 illustrates the unlinking routine U(N). When the operating system or alternately the application program AP(N) determines that the interrupt handler H(N) is to be deleted from the chain, the operating system or alternately the application program AP(N) passes control to the entry point 200 of the unlinking routine U(N) of FIG. 8. The entry point 200 passes to the step 202 which disables the interrupts, gets the interrupt vector V(7), and loads the contents of the interrupt vector into the working registers of the CPU 20. Step 202 then passes to step 204 where a determination is made as to whether the interrupt handler H(N) is the first interrupt handler in the chain, that is, is it the interrupt handler pointed to by the contents of the interrupt vector V(7). If the operation of comparison in step 204 determines that the interrupt handler H(N) is the first interrupt handler pointed to by the interrupt vector V(7), then control passes to step 206 so that the interrupt handler H(N) can be deleted from the chain by loading the pointer P(N) currently in the interrupt handler H(N), into the location of the interrupt vector V(7). At the conclusion of this operation in step 206, control passes to step 220 where the interrupts are re-enabled and the routine passes to the exit point 222 for a return to either the operating system or to the application program AP(N). Alternately, if step 204 determines that the target interrupt handler H(N) which is to be deleted, is not the first interrupt handler in the chain pointed to by the interrupt vector V(7), then control passes from step 204 to step 208 where it is determined whether the interrupt handler contains the validating signature in its control block C(N). If the validating signature is not present, then control passes to the exit point 212 to invoke an error exception handler. Alternately, if step 208 determines that the correct validating signature is present in the control block C(N) of the interrupt handler H(N), then control passes to step 210 where it is determined whether the present interrupt handler H(N) is the target interrupt handler to be deleted. This is done in two steps, the first step in 210 where the contents of the pointer for the preceding interrupt handler has its offset portion compared with the value of the offset for the target interrupt handler. If this test is satisfied, control passes to step 214 where the segment portion of the contents of the preceding pointer is compared with the segment portion of the forward pointer which points to the target interrupt handler. If both tests are passed, then the current interrupt handler H(N) is the target interrupt handler and control passes to step 216. In step 216, the contents of the pointer P(N) of the current (target) interrupt handler H(N) is transferred to the pointer location for the prior interrupt handler in the chain (that is the interrupt handler located adjacent to H(N) and closer to the interrupt vector V(7)). This operation effectively enables the skipping around the target interrupt handler H(N) during subsequent operations of searching for an interrupt handler corresponding to an I/O device which has issued an interrupt. At the completion of step 216, control passes to step 220 where the interrupts are re-enabled and control returns through the exit point 222. Alternately, if either step 210 or step 214 determines that the current interrupt handler H(N) is not the target interrupt handler, then control passes to step 218 where the contents of the current pointer P(N) is used as the relative address of the next interrupt handler in the chain. Control then passes from step 218 back to step 208 and the comparison of the next interrupt handler with the target interrupt handler is conducted. This process repeats until the target interrupt handler is encountered or the end of the chain is reached where control will return to the operating system or alternately to the application program AP(N).

Figure 9:
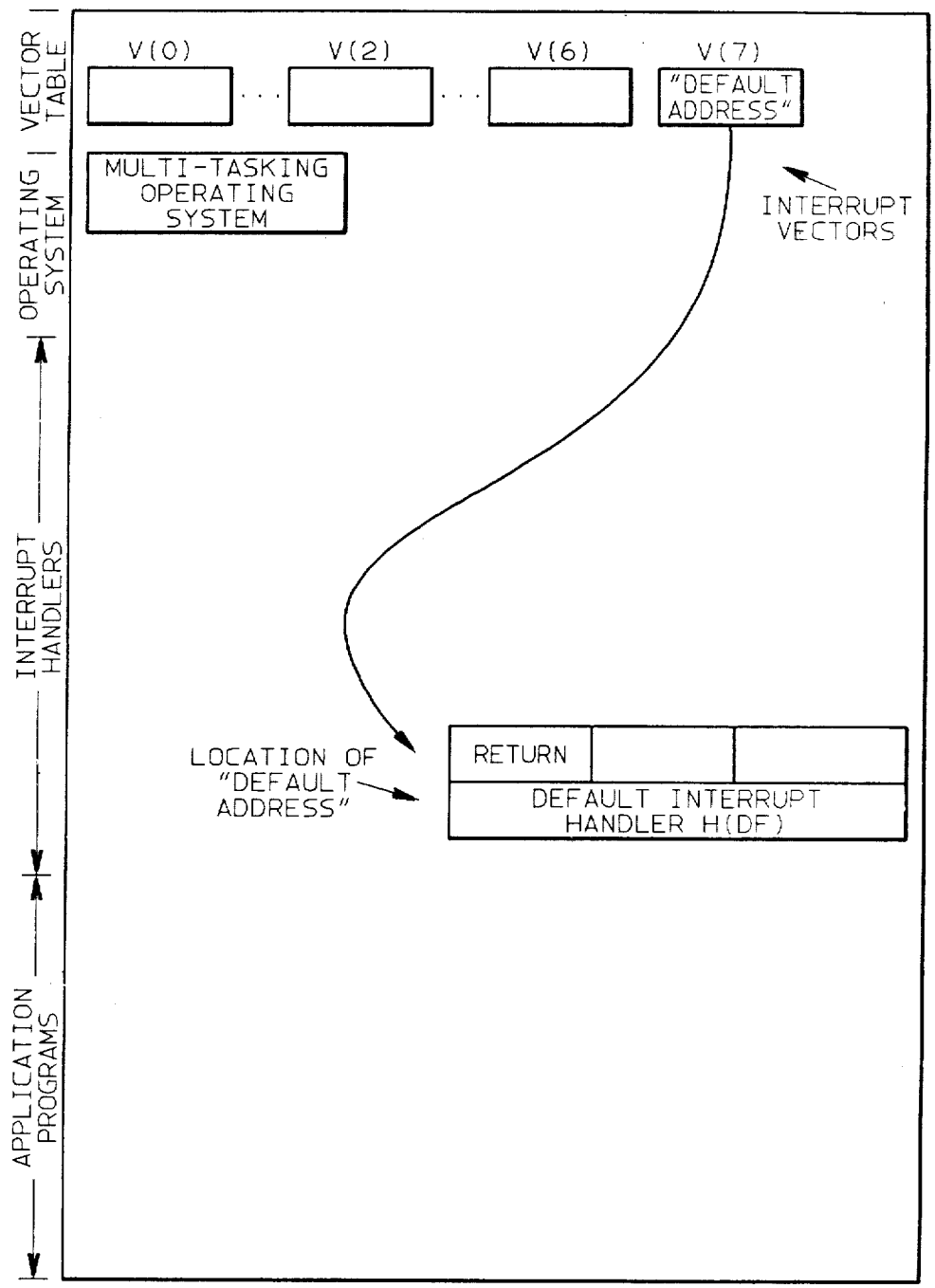
FIG. 9 is a memory map illustrating the initial default interrupt.

Reference is now made to the sequence of FIGS. 9-12 which show the operation of linking newly loaded interrupt handlers into a chain of interrupt handlers in the RAM 32. The operating systems for the IBM Personal Computer are the basic input/output system (BIOS), which is described in the IBM Personal Computer *Technical Reference Manual*, cited above and in the *Disk Operating System* by Microsoft Corporation, Version 2.10, September 1983, published by the International Business Machines Corporation, and the IBM *DOS Technical Reference Manual*, Version 2.10, 1983, published by the International Business Machines Corporation. When the IBM Personal Computer is turned on, the BIOS operating system, which resides in the read only memory ROM 30, carries out initial hardware testing functions and other initialization procedures, and then reads the DOS disk operating system from the disk drive connected to the address bus 24 and data bus 26. The DOS carries out additional initialization procedures, including loading the interrupt vector locations V(0) through V(7) of FIG. 9, with "default addresses." In particular, FIG. 9 shows the RAM 32 with the interrupt vector V(7) being loaded with a "default address" which is the address of the location in RAM 32 of a default interrupt handler H(DF) which serves to return control to the main program whose execution was interrupted in the CPU 20 when the IRQ7 line has an interrupt signal. Effectively, the default interrupt handler H(DF) provides a quick return of control to the interrupted program whenever the IRQ7 line receives an interrupt signal.

In multitasking operating system environments, a multitasking operating system is next loaded into the RAM 32 as is shown in FIG. 9. Typically, the multitasking operating system will partition the RAM 32 into a plurality of protected regions, each of which will contain a separate application program AP(N). The multitasking operating system will install itself between the DOS operating system and the application programs. Whenever an application program AP(N) calls upon DOS to carry out a function or calls upon BIOS to carry out a function, the application program must first go through the multitasking operating system. The multitasking operating system can then decide whether it is time to run one of the other concurrently active application programs AP(N') and it can give control of the system to the new application program instead of continuing the original application program which made the call to DOS. The location of the multitasking operating system in the RAM 32 is shown in FIG. 9.

Figure 10:
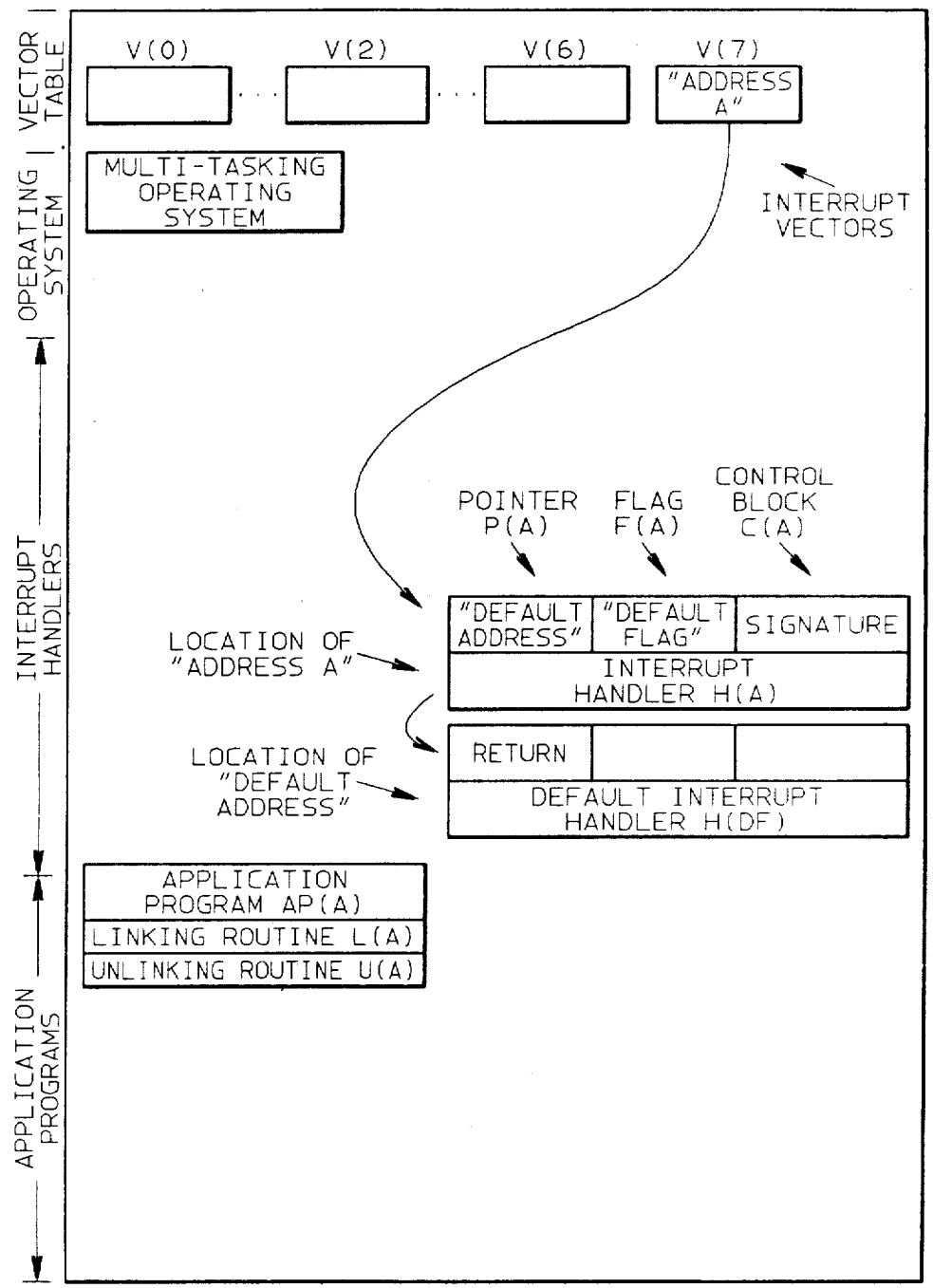
FIG. 10 is a memory map illustrating the linking of a first new interrupt handler H(A).

Next, it is desired to have the system perform a first application A which requires the use of the I/O device 31 and the interrupt line IRQ7. The application program AP(A), which performs the application A, is accompanied by an interrupt sharing program S(A), similar to the Nth application schematically shown in FIG. 14. The interrupt sharing program S(A) consists of three parts, the linking logic routine L(A) shown generally in the flow diagram of FIG. 6 and in Table II, the interrupt handler routine H(A) shown generally in the flow diagram of FIG. 7 and in Table I, and the unlinking logic routine U(A) shown generally in the flow diagram of FIG. 8 and in Table III. The interrupt sharing program S(A) can be loaded when the application program AP(A) is loaded into the memory 32, as is shown in FIG. 10. First, the application program AP(A), its linking routine L(A), and its unlinking routine U(A), are loaded into the memory 32. Then, the linking routine L(A) replaces the existing contents "default address" in the interrupt vector V(7) with a pointer address "address A" which is the address where the beginning of the executable code portion of the interrupt handler H(A) is to be loaded in the memory 32. As is seen in FIG. 10, the interrupt handler H(A) is then loaded starting at the "address A." The control block C(A) associated with the interrupt handler H(A) is loaded at a fixed memory offset from the beginning of the executable code portion of the interrupt handler H(A). In the preferred embodiment, the control block C(A) (which is 16 bytes long) immediately follows the first instruction (a two byte long "JMP" instruction), so that beginning of the pointer P(A) is offset by two bytes from the beginning of the executable code portion of the interrupt handler H(A). This fixed memory offset, which is the relationship between the storage position of the control block C(N) and the interrupt handler H(N), is maintained for all interrupt handlers which are to be chained to the interrupt vector V(7), in accordance with the invention. In order to complete the chain, the linking routine L(A) loads the "default address" into the pointer P(A) of the control block C(A), thereby enabling the interrupt handler H(A) to locate the next consecutive interrupt routine H(DF). Although the fixed offset is disclosed in the preferred embodiment as a positive two bytes from the entry point of each handler, it can be any other constant value, with either a positive or negative relative displacement from the entry point address of each handler.

The control block C(A) includes the pointer P(A), the flag F(A), a signature field and a reserve field, as also indicated in FIG. 14. The pointer P(A) provides the linking mechanism by which other interrupt handlers in the chain are addressed. The contents of the pointer P(A) represents an actual address in the RAM 32 marking the beginning of the next interrupt handler's executable code on the chain. As will be described below, in the unlinking process for the interrupt handlers, the pointers P(N) are used to traverse the chain to locate the interrupt handler which is desired to be removed from the interrupt chain. The signature word in the control block C(A) is a fixed hexadecimal expression which is used to verify the adherence of an interrupt handler to the shared interrupt technique described herein. The signature word is used to specifically identify an interrupt control block C(N) as being a valid interrupt control block. It is possible for an application program running in a multitasking operating system to load itself into the interrupt chain but to not adhere to the shared interrupt method described herein. This would create problems when attempting to unlink that interrupt handler from the interrupt handler chain because the nonconforming interrupt handler would not necessarily maintain an interrupt handler control block CB(N), thereby preventing the successful traversing of the chain. It is the function of the signature word in each control block C(N) to provide a confirmation that the corresponding interrupt handler H(N) can properly share the interrupt handler chain. During the operation of traversing the chain to unlink a particular interrupt handler, if a particular interrupt handler is encountered in the chain which does not have the signature word present in its control block, an exception processing routine is invoked to attempt corrective action.

The primary function of the flag byte F(A) is to indicate whether the interrupt handler H(A) in the chain of interrupt handlers is the last one to be encountered in the chain. This is important to determine since there must be a global rearm signal issued sometime during the process of interrogating the interrupt handlers, in order to reset and unlock the shared interrupt logic units 46 on all of the I/O devices sharing the IRQ7 interrupt line. For example, in the configuration of FIG. 12 where three consecutive interrupt handlers H(A), H(B) and H(C) have been added into the interrupt chain, in that order, the first loaded interrupt handler H(A) must have its flag F(A) store the information that the interrupt handler H(A) will be the last interrupt handler in the chain before the default interrupt handler is encountered. Reference to Table I will show that a "test" instruction is included which tests the flag F(N) for the interrupt handler H(N) to determine whether that interrupt handler is the last interrupt handler in the chain. If the flag byte F(N) indicates that the interrupt handler H(N) is the last interrupt handler in the chain, then, even though that interrupt handler determines that its corresponding I/O device did not issue the interrupt signal, the interrupt handler H(N) must issue a global rearm signal in order to unlock the shared interrupt logic units 46 on all of the I/O devices which share the interrupt line IRQ7. Reference to Table II will illustrate how the linking code checks to see whether the interrupt handler H(N) which is being added is to be the first or earliest added interrupt handler in the chain. If it is in fact the first interrupt handler to be added into the chain, then the interrupt flag F(N) is set to indicate that status so that the interrupt handler will then issue a global rearm signal every time control is passed to it. Reference to the unlinking code example in Table III will illustrate that for the flag byte F(N) for the interrupt handler H(N) which is to be unlinked from the chain, the contents of that flag field F(N) is transferred to the contents of the next preceding interrupt handler. For example, in unlinking the interrupt handler H(B) shown in FIG. 12, the contents F(B) are transferred to the flag field F(C) of the interrupt handler H(C), as is shown in FIG. 13. If the interrupt handler which is being unlinked was in fact the earliest loaded interrupt handler in the chain, for example the interrupt handler H(A) in FIG. 12, then the flag field which would then be transferred to the next preceding interrupt handler in the process of unlinking, would cause the next preceding interrupt handler to force a global rearm signal every time it was encountered in the interrupt handler chain. In this manner, even though interrupt handlers are unlinked from the chain in any order, the last interrupt handler encountered in the chain will always issue a global rearm signal to unlock the shared interrupt logic units on all of the I/O devices sharing the IRQ7 interrupt line.

As an optional feature, the flag byte F(A) in the control block C(A) can also be used to preserve the mask bit settings for the programmable interrupt controller 22, as each consecutive interrupt handler H(N) is processed. The Intel 8259A programmable interrupt controller 22, which is described in the above referenced iAPX 86, 88 Users Manual, includes an interrupt mask register. Rather than all eight interrupts IRQ0 through IRQ7 being disabled or enabled at the same time, the interrupt mask register allows individual interrupt line masking. The interrupt mask register in the programmable interrupt controller 22, is an eight bit register with bits 0-7 directly corresponding to the interrupt lines IRQ0 through IRQ7. Any of these eight interrupt lines can have their input masked by writing into the interrupt mask register and setting the appropriate bit. Likewise, any of the eight interrupt lines can have its input to the programmable interrupt controller 22 enabled by clearing the correct interrupt mask register bit. The utility of this feature is, for example, when a particular interrupt handler routine H(N) is to only be interrupted by specific lower priority interrupts and certain higher priority interrupts are to be disabled during its service routine. The flag byte F(A) in the control block C(A) contains the eight masking bits which are loaded into the interrupt mask register of the programmable interrupt controller 22. The flag byte F(A) in the control block C(A) serves two purposes in this regard. First, it serves as a log of the setting of the mask bits in the programmable interrupt controller 22 when the linking routine L(A) installed the interrupt handler H(A). Secondly, the flag byte F(A) serves specific purpose during normal interrupt handling operations. In the process previously described for searching the chain for the interrupt handler corresponding to the device issuing an interrupt, when a given interrupt handler determines that its corresponding I/O device did not cause the current interrupt, it will pass control to the next interrupt handler in the chain. However, an exception to this passage of control to the next interrupt handler will occur when the flag byte F(N) indicates that the next interrupt handler on the chain would not have normally received control when this particular interrupt signal occurred on the IRQ7 line. In such a situation, normally, the next interrupt handler would not even have been accessed by the interrupt vector V(7) because the issuance of an interrupt request IREQ from the programmable interrupt controller 22 to the CPU 20 would have been masked by the mask bit in the programmable interrupt controller 22. Therefore, in such a situation, the current interrupt handler H(N) having control will not pass that control onto the next interrupt handler in the chain H(N−1), but instead, can either pass control back to the main program which was interrupted by the current interrupt, or alternately it can pass control to the second next interrupt handler H(N−2) by reading the contents of the pointer P(N−1) of the next interrupt handler H(N−1) and then skipping the next interrupt handler H(N−1) so as to pass control to the second next interrupt handler H(N−2).

The flag byte F(A) also has some significance in the unchaining process. As was previously mentioned, and as will be further explained below, when an interrupt handler H(N) is taken out of the chain, the contents of its pointer P(N) is loaded into the pointer P(N+1) of the control block C(N+1) of the previous interrupt handler H(N+1). The unlinking logic U(N) also loads the contents of the flag byte F(N) into the flag byte field F(N+1) of the preceding interrupt handler H(N+1) control block C(N+1). This will enable the preservation of the mask byte for the programmable interrupt controller 22.

Returning now to the explanation of the operation of the linking routine, FIG. 11 shows the operation of loading a second application program AP(B) along with its interrupt sharing program S(B) which consists of the linking routine L(B), the unlinking routine U(B), and the interrupt handler H(B). In a manner similar to that described above for the linking of the interrupt handler H(A), the linking routine L(B) goes through the procedure of loading and linking the interrupt handler H(B) by loading the current contents "address A" of the interrupt vector V(7) into the pointer field P(B) of the control block C(B) of the interrupt handler H(B). Then, the value "address B" is loaded into the interrupt vector V(7), and this is the address of the location of the start of the executable code for the interrupt handler H(B). The interrupt handler code for H(B) is loaded starting at that location and the control block C(B) is loaded at the fixed memory offset of two bytes higher in memory from the "address B" location, in accordance with the invention.

Figure 12:
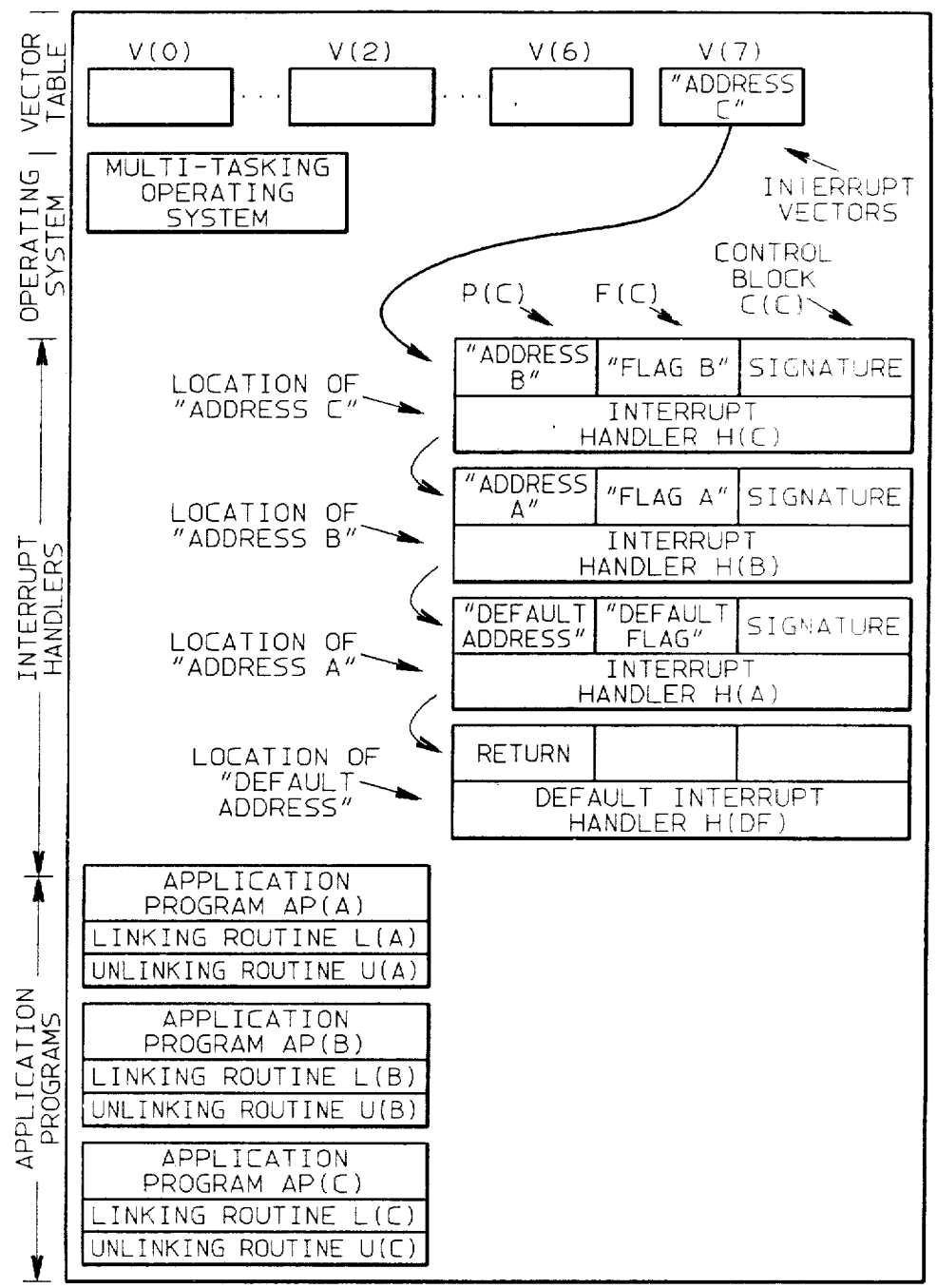
FIG. 12 is a memory map illustrating the linking of a third new interrupt handler H(C).

FIG. 12 illustrates the operation of loading a third application program AP(C) into the RAM 32 and of linking its interrupt handler H(C). The linking operation occurs in the same manner as that described for the interrupt handlers H(B) and H(A), the operation being carried out by the linking routine L(C). As a result, FIG. 12 shows that the interrupt vector V(7) has as its contents the value "address C" which points to the location of the beginning of the executable code for the interrupt handler H(C). The control block C(C) is located at the fixed memory offset of two bytes higher in memory from the location "address C." The contents of the pointer P(C) contains the value "address B" which points, in turn, to the location of "address B" for the interrupt handler H(B). Reference can be made to the flow diagram of FIG. 6 and the assembler code of Table II for a generalized explanation of the sequence of steps and instructions in carrying out the linking operation by means of a linking routine L(N). As with Table I, the code in Table II is assembler code whose significance is explained in the *Macro Assembler* reference cited above.

FIG. 13 illustrates the operation of unlinking the interrupt handler H(B) from the chain of interrupt handlers H(C), H(B) and H(A) shown in FIG. 12. Reference can be made to the flow diagram of FIG. 8 showing the generalized operation of the unlinking routine U(N), and reference can also be made to Table III which gives a generalized assembler code sequence of instructions for carrying out the unlinking routine U(N). The unlinking routine U(B) of FIG. 12 must first locate position of the interrupt handler H(B) within the chain. This is performed by starting at the interrupt vector V(7) and using the forward pointer P(N) for each consecutive interrupt handler routine H(N) to find the entry point for the next interrupt handler routine H(N−1). As each interrupt handler routine in the chain is encountered, in the order H(C), H(B) and H(A), respectively, its identity is compared with the identity of the target interrupt handler H(B) to be deleted, in the process of traversing the chain. When the unlinking routine U(B) encounters a target interrupt handler routine H(B) in the chain, the interrupt handler H(B) is unlinked by loading the contents of the pointer P(B) for the interrupt handler to be deleted, into the location of the pointer P(C) for the next preceding interrupt handler H(C). As was discussed above, the contents of the flag field F(B) is also loaded into the flag field F(C) of the interrupt handler H(C). After this step, the contents of the pointer location P(C) is "address A" which points to the beginning of the executable code portion of the interrupt handler H(A). This effectively allows the chain to skip around the unlinked interrupt handler H(B). This has special significance in a mulitasking operating system environment since programs in such an environment can be started or terminated at any time and in any order. Thus, it is by virtue of the control block C(N) having a fixed memory offset location with respect to the beginning of its interrupt handler H(N), which enables the interrupt handlers to reference the location of one another, thereby enabling the out-of-order unlinking of any interrupt handler in the chain.

The microcomputer system chosen to illustrate the principle of the invention herein is the IBM Personal Computer Model PC-1 which uses the Intel 8088 CPU. However, the principle of the invention disclosed herein can also be applied to the IBM Personal Computer AT which employs an Intel 80286 CPU. In the IBM Personal Computer AT architecture, there are two Intel 8259A programmable interrupt controllers which provide for 15 I/O device interrupt lines. Any one of these interrupt lines can be shared in a manner similar to the sharing of an interrupt line in the 8088 CPU architecture described above. A chain of interrupt handlers which are pointed to by an interrupt vector, will operate in the same manner as was described above for the operation of the interrupt handlers and their paired I/O devices for the 8088 architecture.

TABLE I

EXAMPLE OF AN INTERRUPT HANDLER

| | | | |
|---|---|---|---|
| YOUR_CARD | EQU | xxxx | ; Location of your card int.<br>; control/status register |
| ISB | EQU | xx | ; Interrupt bit in your card's<br>; int. control status reg. |
| REARM | EQU | 2F7H | ; Global Rearm location for<br>; interrupt level 7 |
| SPC_EOI | EQU | 67H | ; Specific EOI for 8259's int.<br>; level 7 |
| EOI | EQU | 20H | ; Nonspecific EOI |
| OCR | EQU | 20H | ; Location of 8259 operational<br>; control register |
| IMR | EQU | 21H | ; Location of 8259 int. mask reg. |
| MYCSEG | SEGMENT<br>ASSUME | PARA<br>CS:MYCSEG,DS:DSEG | |
| ENTRY | PROC<br>JMP | FAR<br>SHORT PAST | ; Entry point of handler |
| FPTR | DD | 0 | ; Forward Pointer |
| SIGNATURE | DW | 424BH | ; Used when unlinking to identify<br>; compatible int. handlers |
| FLAGS | DB | 0 | ; Flags |
| FIRST | EQU | 80H | |
| JMP | SHORT | RESET | |
| RES_BYTES | DB | 7 DUP (0) | ; Future expansion |
| PAST: | STI | | ; Actual start of handler code |
| | PUSH | | ; Save needed registers |
| | MOV | DX,YOUR_CARD | ; Select your status register |
| | IN | AL,DX | ; Read the status register |
| | TEST | AL,ISB | ; Your card caused the int.? |
| | JNZ | SERVICE | ; Yes, branch to service logic |
| | TEST | CS:FLAGS,FIRST | ; Are we the first ones in? |
| | JNZ | EXIT | ; If yes, branch for EOI<br>; and Rearm |
| | POP | ... | ; Restore registers |
| | CLI | | ; Disable interrupts |
| | JMP | DWORD PTR CS:FPTR | ; Pass control to next<br>; guy on chain |
| SERVICE | ... | | ; Service the interrupt |
| EXIT: | | | |
| | CLI | | ; Disable the interrupts |
| | MOV | AL,EOI | |
| | OUT | OCR,AL | ; Issue nonspecific EOI to 8259 |
| | MOV | DX,REARM | ; Rearm the cards |
| | OUT | DX,AL | |
| | POP | | ; Restore registers |
| | IRET | | |
| RESET: | ... | | ; Disable your card |
| | RET | | ; Return FAR to operating system |
| ENTRY | ENDP | | |
| | MYCSEG | ENDS | |
| | END | ENTRY | |

TABLE II

LINKING CODE EXAMPLE

```
PUSH       ES
CLI                                  ; Disable interrupts
; Set forward pointer to value of interrupt vector in low memory
ASSUME     CS:CODESEG,DS:CODESEG
PUSH       ES
MOV        AX,350FH                  ; DOS get interrupt vector
INV        21H
MOV        SI,OFFSET CS:FPTR         ; Get offset of your forward pointer
                                     ;   in an indexable register
MOV        CS:[SI],BX                ; Store the old interrupt vector
MOV        CS:[SI+2],FS              ;   in your forward pointer for chaining
CMP        CMP BYTE PTR ES:
           [BX], 0CFH                ; Test for IRET
JNZ        SETVECTR
MOV        CS:FLAGS,FIRST            ; Set up first in chain flag
SETVECTR:
POP        ES
PUSH       DS
; Make interrupt vector in low memory point to your handler
MOV        DX,OFFSET ENTRY           ; Make interrupt vector point to your
                                     ;   handler
MOV        AX,SEG ENTRY              ; If DS not = CS, get it
MOV        DS,AX                     ;   and put it in DS
MOV        AX,250FH                  ; DOS set interrupt vector
INT        21H
```

TABLE II-continued
LINKING CODE EXAMPLE

| | | |
|---|---|---|
| POP | DS | |
| Unmask (enable) interrupts for your level | | |
| IN | AL,IMR | ; Read interrupt mask register |
| JMP | $+2 | ; IO delay |
| AND | AL,07FH | ; Unmask interrupt level 7 |
| OUT | IMR,AL | ; Write new interrupt mask |
| MOV | AL,SPC_EOI | ; Issue specific EOI for level 7 |
| JMP | $+2 | ; IO delay |
| OUT | OCR,AL | ; to allow pending level 7 interrupts |
| | | ;   (if any) to be serviced |
| STI | | ; Enable interrupts |
| POP | ES | |

TABLE III
UNLINKING CODE EXAMPLE

| | | |
|---|---|---|
| PUSH | DS | |
| PUSH | ES | |
| CLI | | ; Disable interrupts |
| MOV | AX,350FH | ; DOS get interrupt vector |
| INT | 21H | ; ES:BX points to first of chain |
| MOV | CX,ES | ; Pickup segment part of int. vector |
| ; Are we the first handler in the chain? | | |
| MOV | AX,SEG ENTRY | ; Get code seg into comparable reg. |
| CMP | BX,OFFSET ENTRY | ; Int. vector in low memory |
| | | ;   pointing to your handler's |
| | | ;   offset? |
| JNE | UNCHAIN_A | ; No, branch |
| CMP | AX,CX | ; Vector pointing to your handler's |
| | | ;   segment? |
| JNE | UNCHAIN_A | ; No, branch |
| ; Set interrupt vector in low memory to point to the handler | | |
| ;   pointed to by your pointer | | |
| PUSH | DS | |
| MOV | MOV DX,WORD PTR CS:FPTR | |
| MOV | MOV DS,WORD PTR CS:FPTR [2] | |
| MOV | AX,250FH | ; DOS set interrupt vector |
| INT | 21H | |
| POP | DS | |
| JMP | UNCHAIN_X | |
| UNCHAIN_A: | ; BX = FPTR offset, ES = FPTR segment, CX = CS | |
| CMP | ES:[BX+6],4842H | ; Is handler using the appropriate |
| | | ;10 conventions (is SIGNATURE |
| | | ;   present in the interrupt |
| | | ;   chaining structure)? |
| JNE | exception | ; No, invoke error exception handler |
| LDS | SI,ES:[BX+2] | ; Get FPTR±s segment and offset |
| CMP | SI,OFFSET ENTRY | ; Is this forward pointer pointing |
| | | ;   to your handler's offset? |
| JNE | UNCHAIN_B | ; No, branch |
| MOV | CX,DS | ; Move to compare |
| CMP | AX,CX | ; Is this forward pointer pointing |
| | | ;   to your handler's segment? |
| JNE | UNCHAIN_B | ; No, branch |
| Located your handler in the chain | | |
| MOV | AX,WORD PTR CS:FPTR | ; Get your FPTR±s offset |
| MOV | ES:[BX+2],AX | ; Replace offset of FPTR of handler |
| | | ;   that points to you |
| MOV | AX,WORD PIR CS:FPTR[2] | ; Get your FPTR's segment |
| MOV | ES:[BX+4],AX | ; Replace segment of FPTR of handler |
| | | ;   that points to you |
| MOV | AL,CS;FLAGS | ; Get your flags |
| AND | AL,FIRST | ; Isolate FIRST flag |
| OR | ES:[BX+6],AL | ; Set your first flag into prior |
| | | ;   routine |
| JMP | UNCHAIN_X | |
| UNCHAIN_B: | | |
| MOV | BX,SI | ; Move new offset to BX |
| PUSH | DS | |
| PUSH | ES | |
| JMP | UNCHAIN_A | ; Examine next handler in chain |
| UNCHAIN_X | | |
| STI | | ; Enable interrupts |
| POP | ES | |
| POP | DS | |

Although a specific embodiment of the invention has been disclosed, it will be understood by those of skill in the art, that the foregoing and other changes in form and details may be made therein without departing from the spirit and the scope of the invention.

What is claimed is:

1. In a microcomputer including a central computing means, a memory and a plurality of I/O devices connected together by a bus, each of said I/O devices having an output connected to a common interrupt line, for transmitting a corresponding interrupt signal on said interrupt line, and each of said I/O devices having an input connected to said common interrupt line, for monitoring said interrupt line for an occurrence of an interrupt signal thereon and for blocking a transmission of subsequently occurring interrupt signals in response thereto, a system for enabling said I/O devices to share said common interrupt line, comprising:

a plurality of interrupt handler rountines stored as an ordered chain in said memory, each having an instruction portion containing an ordered sequence of instructions executable by said central computing means, to service interrupt demands of a respective one of said I/O device, and each interrupt handler routine having a control block portion located at a fixed relative position from a beginning instruction position of said instruction portion, for storing a pointer address to a beginning instruction position of the instruction portion for a next occuring interrupt handler routine in said chain;

said central computing means interrupting an existing execution of a main program and accessing over said bus, an interrupt vector location in said memory in response to an interrupt signal on said interrupt line, said vector location storing the address of a beginning instruction position of the instruction portion for a first occurring interrupt handler routine in said chain corresponding to a first I/O device of said plurality of I/O devices;

said central computing means executing a status determination segment of said instruction portion of said first interrupt handler routine and in response thereto, accessing over said bus, an interrupt status value stored by said first I/O device, and determining whether said first I/O device caused said interrupt signal to be transmitted on said interrupt line;

said central computing means executing a service routine segment of said instruction portion of said first interrupt handler routine in response to a determination by said central computing means that said first I/O device caused said interrupt signal, for servicing an interrupt demand of said first I/O device;

said central computing means executing a global rearm segment of said instruction portion of said first interrupt handler routine and in response thereto, transmitting a global rearm message over said bus to all of said plurality of I/O devices, for unblocking a transmission of said subsequently occurring interrupt signals from said I/O devices, prior to returning control back to said main program;

said central computing means excuting a control transfer segment of said instruction portion of said first interrupt handler rountine in response to a determination by said central computing means that said first I/O device did not cause said interrupt signal, said central computing means in response thereto, accessing over said bus, said pointer address in said control block portion of said first interrupt handler routine, for commencing execution of the instruction portion of said next occurring interrupt handler in said chain to service interrupt demands in a corresponding second one of said I/O devices;

whereby a plurality of I/O devices can share said common interrupt line.

2. The system of claim 1, which further comprises:

said control block portion of each of said interrupt handler routines including a flag field, for indicating if a corresponding interrupt handler routine is a last occurring one in said chain;

said central computing means executing a flag evaluation segment of said instruction portion of said interrupt handler routines, following said determination that a corresponding I/O device did not cause the interrupt signal, to evaluate if said corresponding interrupt handler routine is said last occurring one in the chain, and if it is said last occurring one in said chain, said central computing means executing said global rearm segment prior to returning control back to said main program.

3. The system of claim 1, which further comprises:

a linking routine stored in said memory, having an instruction portion containing instructions executable by said central computing means, to link a new interrupt handler routine into said chain, by storing an existing contents of said interrupt vector location in a control block portion of said new interrupt handler as a pointer address to a beginning instruction position of the instruction portion for a next occurring interrupt handler rountine in the chain, and storing the address to a beginning instruction position of the instruction portion of said new routine in said interrupt vector location in said memory.

4. The system of claim 1, which further comprises:

an unlinking routine stored in said memory, having an instruction portion containing instructions executable by said central computing means, to unlink a target interrupt handler routine by reading a contents of said interrupt vector to locate a first occurring interrupt handler in said chain, comparing an indentity of said first interrupt handler with that of said target interrupt handler, reading the pointer address in the control block portion located at a fixed relative position from a beginning instruction position of said instruction portion of said first interrupt handler to locate a next occurring interrupt handler in said chain, comparing an identity of said next interrupt handler and determining that is is said target interrupt handler, transferring the pointer in the control block portion located at a fixed relative position from a beginning instruction position of said instruction portion of said next occurring interrupt handler, into said control block poriton of said first interrupt handler;

whereby said chain of interrupt handlers will skip around said target interrupt handler.

5. In a microcomputer including a central computer means, a memory and a plurality of I/O devices connected together by a bus, a combiantion for enabling said plurality of I/O devices to share a common interrupt line connected to said central computing means, comprising:

a plurality of interrupt logic means, each having a first input connected to an interrupt output of a corresponding one of said plurality of I/O devices, and each having an output connected to said common interrupt line, for transmitting a corresponding interrupt signal on said common interrupt line in response to an interrupt demand output from said corresponding I/O device and storing an interrupt status value;

said interupt logic means each having a second input connected to said common interrupt line, for monitoring said common interrupt line for an occurrence of an interrupt signal thereon and for blocking a transmission of subsequently occurring interrupt signals in response thereto;

a plurality of interrupt handler rountines stored as a chain in said memory, each having an instruction portion containing instructions executable by said central computing means, to service interrupt demands of a respective one of said I/O devices, and each interrupt handler routine having a control block portion located at a fixed relative position from a beginning instruction position of said isntruction portion, for storing a pointer address to said beginning of the instruction portion for a next occurring interrupt handler routine in said chain;

said central computing means interrupting an existing execution of a main program and accessing over said bus, an interrupt vector location in said memory in response to an interrupt signal on said common interrupt line, said vector location storing the address of a beginning instruction position of the instruction portion for a first occurring interrupt handler routine in said chain corresponding to a first I/O device of said plurality of I/O devices;

said central computing means executing a status determination segment of said instruction portion of said first occurring interrupt handler routine and in response thereto, accessing over said bus, an interrupt status value stored by an interrupt logic means for said first I/O device, and determining whether said first I/O device caused said interrupt signal to be transmitted on said common interrupt line;

said central computing means exeucting a service routine segment of said instruction portion of said first occurring interrupt handler routine in response to a determination by said central computing means that said first I/O device caused said interrupt signal, for servicing said interrupt demand of said first I/O device;

said central computing means executing a global rearm segment of said instruction portion of said first occurring interrupt handler routine and in response thereto, transmitting a global rearm message over said bus to said interrupt logic means for all of said plurality of I/O devices, for unblocking a transmission of subsequently occurring interrupt signals from said I/O devices, prior to returning control back to said main program;

said central computing means executing a control transfer segment of said instruction portion of said first occurring interrupt handler routine in response to a determination by said cnetral computing means that said first I/O device did not cause said interrupt signal, said central computing means in response thereto, accessing over said bus, said pointer address in said control block portion of said first occurring interrupt handler routine, for commencing execution of the instruction portion of said next occurring interrupt handler in said chain to service interrupt demands in a corresponding second one of said I/O devices;

whereby a plurality of I/O devices can share said common interrupt line.

6. The combination of claim 5, which further comprises:

said control block portion of each of said interrupt handler routines including a flag field, for indicating if a corresponding interrupt handler routine is a last occurring one in said chain;

said central computing means executing a flag evaluation segment of said instruction portion of said interrupt handler rountines, following said determination that a corresponding I/O device did not cause the interrupt signal, to evaluate if a corresponding interrupt handler routine is a last occurring one in the chain, and if it is a last occuring one in said chain, said central computing means executing a global rearm segment prior to returning control back to said main program.

7. The combination of claim 5, which further comprises:

a linking routine stored in said memory, having an instruction portion containing instructions executable by said central computing means, to link a new interrupt handler routine into said chain, by storing an existing contents of said interrupt vector location in a control block portion of said new interrupt handler as a pointer address to a beginning instruction position of the instruction portion for a next occurring interrupt handler routine in the chain, and storing the address to a beginning instruction position of the instruction portion of said new routine in said interrupt vector location in said memory.

8. The combination of claim 5, which further comprises:

an unlinking routine stored in said memory, having an instruction portion containing instructions executable by said central computing means, to unlink a target interrupt handler routine by reading a contents of said interrupt vector to locate a first occurring interrupt handler in said chain, comprising an indentity of said first interrupt handler with that of said target interrupt handler, reading the pointer address in the control block portion located at a fixed relative position from a beginning instruction position of said instruction portion of said first interrupt handler to locate a next occurring interrupt handler in said chain, comparing an identity of said next interrupt handler and determining that it is said target interrupt handler, transferring the pointer address in the control block portion located at a fixed relative position from a beginning instructions position of said instruction portion of a next occurring interrupt handler, into said control block portion of said first interrupt handler;

whereby said chain of interrupt handlers will skip around said target interrupt handler.

9. In a microcomputer including a central computing means, a memory and a plurality of I/O devices connected together by a bus, each of said I/O devices having an output connected to a common interrupt line, for transmitting a corresponding interrupt signal on said interrupt line, and each of said I/O devices having an input connected to said common interrupt line, for monitoring said interrupt line for an occurrence of an interrupt signal thereon and for blocking a transmission of subsequently occuring interrupt singals in response thereto, a method for enabling said I/O devices to share said common interrupt line, comprising:

storing a plurality of interrupt handler rountines as an ordered chain in said memory, each having an instruction portion containing an ordered sequence of instructions executable by said central computing means, to service interrupt demands of respective one of said I/O devices, and each interrupt handler routine having a control block portion located at a fixed relative position from a beginning instruction position of said instruction portion, for storing a pointer address to a beginning instruction position of the instruction portion for a next occurring interrupt handler routine in said chain;

interrupting said central computing means during an existing of a main program and accessing over said bus, an interrupt vector location in said memory in response to an interrupt signal on said interrupt line, said vector location storing the address of a beginning instruction position of the instruction portion for a first occurring interrupt handler routine in said chain corresponding to a first I/O device of said plurality of I/O devices;

executing in said central computing means, a status determination segment of said instruction portion of said first interrupt handler routine and in response thereto, accessing over said bus, an interrupt status value stored by said first I/O device, and determining whether said first I/O device caused said interrupt signal to be transmitted on said interrupt line;

executing in said central computering means, a service routine segment of said instruction portion of said first interrupt handler routine in response to a determination by said central computing means that said first I/O device caused said interrupt signal for servicing an interrupt demand of said first I/O device;

executing in said central computing means a global rearm segment of said instruction portion of said first interrupt handler routine and in response thereto, transmitting a global rearm message over said bus to all of said plurality of of I/O devices, for unblocking a transmission of said subsequently occurring interrupt signals from said I/O devices, prior to returning control back to said main program;

executing in said central computing means, a control transfer segment of said instruction portion of said first interrupt handler routine in response to a determination by said central computing means that said first I/O device did not cause said interrupt signal, said central computing means in response thereto, accessing over said bus, said pointer address in said control block portion of said first interrupt handler routine, for commencing execution of the instruction portion of said next occurring interrupt handler in said chain too service interrupt demands in a corresponding second one of said I/O devices;

whereby a plurality of I/O devices can share said common interrupt line.

10. The method of claim 9, which further comprises:
said control block portion of each of said interrupt handler routines including a flag field, for indicating if a corresponding interrupt handler routine is a last occurring one in said chain;

executing in said central computing means, a flag evaluation segment of said instruction portion of said interrupt handler routines, following said determination that a corresponding I/O device did not cause the interrupt signal, to evaluate if said corresponding interrupt handler routine is said last occurring one in the chain, and if it is said last occurring one in said chain, said central computing means executing said global rearm segment prior to returning control back to said main program.

11. The method of claim 9, which further comprises:
a linking routine stored in said memory, having an instruction portion containing instructions executable by said central computing means, to link a new interrupt handler routine into said chain;

said linking routine storing an existing contents of said interrupt vector location in a control block portion of said new interrupt handler as a pointer address to a beginning instruction position of the instruction portion for a next occurring interrupt handler routine in the chain;

said linking routine storing the address to a beginning instruction position of the instruction portion of said new routine in said interrupt vector location in said memory.

12. The method of claim 9, which further comprises:
an unlinking routine stored in said memory, having an instruction portion containing instructions executable by said central computing means, to unlink a target interrupt handler routine;

said unlinking routine reading a contents of said interrupt vector to a locate a first occurring interrupt handler in said chain;

said unlinking routine comparing an identity of said first interrupt handler with that of said target interrupt handler;

said unlinking routine reading the pointer address in the control block portion located at a fixed relative position from a beginning instruction position of said instruction portion of said first interrupt handler to locate a next occurring interrupt handler in said chain;

said unlinking routine comparing an identity of said next interrupt handler and determining that it is said target interrupt handler;

said unlinking routine transferring the pointer address in the control block portion located at a fixed relative position form a beginning instruction posiiton of said instruction portion of said next occurring interrupt handler, into said control block portion of said first interrupt handler;

whereby said chain of interrupt handlers will skip around said target interrupt handler.

13. In a microcomputer including a central computing means, a memory and a plurality of I/O devices connected together by a bus, each of said I/O devices including an output connected to a common interrupt line, for transmitting a corresponding interrupt signal on said interrupt line, and each of said I/O devices having an input connected to said common interrupt line, for monitoring said interrupt line for an occurrence of an interrupt signal thereon and for blocking a transmission of subsequently occurring interrupt signals in response thereto, a system for enabling said I/O devices to share said common interrupt line, comprising:

a plurality of interrupt handler routines stored as a chain in said memory, to service interrupt demands of respective ones of said I/O devices, and each storing a pointer address to a beginning of a next occurring interrupt handler routine in said chain;

said central computing means interrupting an existing execution of a main program and accessing over said bus, an interrupt vector location in said memory in response to an interrupt signal on said interrupt line, said vector location storing the address of a beginning of a first occurring interrupt handler routine in said chain corresponding to a first one of said I/O devices;

said central computing means executing a status determination routine for determining whether said first one of said I/O devices caused said interrupt signal to be transmitted on said interrupt line;

said central computing means executing a service routine for servicing an interrupt demand of said first one of said I/O devices;

said central computing means executing a rearm routine for unlocking a transmission of said subsequently occurring interrupt signals from said I/O devices, prior to returning control back to said main program;

said central computing means executing a control transfer routine for commencing an execution of a next occurring interrupt handler in said chain to service interrupt demands in a corresponding second one of said I/O devices, if said first one of said I/O devices did not cause said interrupt signal;

whereby a plurality of I/O devices can share said common interrupt line.

14. In a microcomputer including a central computing means, a memory and a plurality of I/O devices connected together by a bus, each of said I/O devices having an output connected to a common interrupt line, for transmitting a corresponding interrupt signal on said interrupt line, and each of said I/O devices having an input connected to said common interrupt line, for monitoring said interrupt line for an occurrence of an interrupt signal thereon and for blocking a transmission of subsequently occurring interrupt signals in response thereto, a method for enabling said I/O devices to share said common interrupt line, comprising:

storing a plurality of interrupt handler routines as a chain in said memory, to service interrupt demands of respective ones of said I/O devices, and each storing a pointer address to a beginning of a next occurring interrupt handler routine in said chain;

interrupting said central computing means during an existing execution of a main program and accessing over said bus, an interrupt vector location in said memory in response to an interrupt signal on said interrupt line, said vector location storing the address of a beginning of a first occurring interrupt handler routine in said chain corresponding to a first one of said I/O devices;

executing in said central computing means, a status determination routine for determining whether said first one of said I/O devices caused said interrupt signal to be transmitted on said interrupt line;

executing in said central computing means, a service routine for servicing an interrupt demand of said first one of said I/O devices;

executing in said central computing means a rearm routine for unblocking a transmission of said subsequently occurring interrupt signals from said I/O devices, prior to returning control back to said main program;

executing in said central computing means, a control transfer routine for commencing an execution of a next occurring interrupt handler in said chain to service interrupt demands in a corresponding second one of said I/O devices, if said first one of said I/O devices did not cause said interrupt signal;

whereby a plurality of I/O devices can share said common interrupt line.

* * * * *